(12) United States Patent
Suzuki et al.

(10) Patent No.: US 10,779,322 B2
(45) Date of Patent: Sep. 15, 2020

(54) TERMINAL APPARATUS, BASE STATION APPARATUS, COMMUNICATION METHOD, AND INTEGRATED CIRCUIT

(71) Applicants: Sharp Kabushiki Kaisha, Sakai, Osaka (JP); FG Innovation Company Limited, New Territories (HK)

(72) Inventors: Shoichi Suzuki, Sakai (JP); Tatsushi Aiba, Sakai (JP); Wataru Ouchi, Sakai (JP); Takashi Hayashi, Sakai (JP); Tomoki Yoshimura, Sakai (JP); Liqing Liu, Sakai (JP); Kimihiko Imamura, Sakai (JP)

(73) Assignees: SHARP KABUSHIKI KAISHA, Sakai (JP); FG INNOVATION COMPANY LIMITED, New Territories (HK)

( * ) Notice: Subject to any disclaimer, the term of this patent is extended or adjusted under 35 U.S.C. 154(b) by 0 days.

(21) Appl. No.: 16/313,928

(22) PCT Filed: Jun. 29, 2017

(86) PCT No.: PCT/JP2017/023897
§ 371 (c)(1),
(2) Date: Dec. 28, 2018

(87) PCT Pub. No.: WO2018/003913
PCT Pub. Date: Jan. 4, 2018

(65) Prior Publication Data
US 2019/0327761 A1    Oct. 24, 2019

(30) Foreign Application Priority Data
Jun. 30, 2016    (JP) .................................. 2016-129851

(51) Int. Cl.
*H04W 4/00* (2018.01)
*H04W 72/14* (2009.01)
*H04W 28/04* (2009.01)

(52) U.S. Cl.
CPC ............ *H04W 72/14* (2013.01); *H04W 28/04* (2013.01)

(58) Field of Classification Search
CPC ........ H04L 1/08; H04L 1/1896; H04W 28/04; H04W 72/04; H04W 72/042;
(Continued)

(56) References Cited

U.S. PATENT DOCUMENTS

| 9,042,327 B2 * | 5/2015 | Yang | H04L 1/1825 370/329 |
| 10,178,657 B2 * | 1/2019 | Tseng | H04W 72/042 |

(Continued)

OTHER PUBLICATIONS

Panasonic, Reception of DCI formats, 3GPP TSG-RAN Meeting #55, 9 pages, Nov. 2008.*

(Continued)

*Primary Examiner* — Frank Duong

(57) ABSTRACT

Provided is a terminal apparatus configured to: receive, in a first PDCCH, a first uplink grant to which first CRC parity bits scrambled with a C-RNTI for a dynamically scheduled transmission is attached; receive, in a second PDCCH, a second uplink grant to which second CRC parity bits scrambled with SPS C-RNTI for a semi-persistently scheduled transmission is attached; perform multiple transmissions corresponding to a bundle, based on the first uplink grant or the second uplink grant; and determine a redundancy version corresponding to each of the multiple transmissions, excluding a first transmission of the multiple transmissions, based at least on whether the bundle is associated with the second uplink grant.

4 Claims, 19 Drawing Sheets

(58) Field of Classification Search
CPC . H04W 72/12; H04W 72/1278; H04W 72/14; H04W 76/20
See application file for complete search history.

(56) References Cited

U.S. PATENT DOCUMENTS

| | | | |
|---|---|---|---|
| 2017/0289733 A1* | 10/2017 | Rajagopal | H04L 67/12 |
| 2018/0070385 A1* | 3/2018 | Yang | H04W 72/12 |
| 2019/0174327 A1* | 6/2019 | You | H04W 16/14 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.6.0, Jun. 2015, pp. 1-77.
Ericsson, "L2 enhancements to reduce latency", 3GPP TSG-RAN WG2 #91, Tdoc R2-153490, Aug. 24-28, 2015, pp. 1-7.
"Status Report to TSG", 3GPP TSG RAN meeting #72, RP-161022, Jun. 13-16, 2016, pp. 1-6.

* cited by examiner

Special fields for Semi-Persistent Scheduling Activation PDCCH/EPDCCH Validation

| | DCI format 0 | DCI format 1/1A |
|---|---|---|
| TPC command for scheduled PUSCH | set to '00' | N/A |
| Cyclic shift DMRS | Set to '000' | N/A |
| Modulation and coding scheme and redundancy version | MSB is set to '0' | N/A |
| HARQ process number | N/A | FDD: set to '000'<br>TDD: set to '0000' |
| Modulation and coding scheme | N/A | MSB is set to '0' |
| Redundancy version | N/A | set to '00' |

FIG. 5

Special fields for Semi-Persistent Scheduling Release PDCCH/EPDCCH Validation

| | DCI format 0 | DCI format 1/1A |
|---|---|---|
| TPC command for scheduled PUSCH | set to '00' | N/A |
| Cyclic shift DMRS | Set to '000' | N/A |
| Modulation and coding scheme and redundancy version | set to '11111' | N/A |
| Resource block assignment and hopping resource allocation | set to all '1' s | N/A |
| HARQ process number | N/A | FDD: set to '000' TDD: set to '0000' |
| Modulation and coding scheme | N/A | set to '11111' |
| Redundancy version | N/A | set to '00' |
| Resource block assignment | N/A | set to all '1' s |

FIG. 6

Set $k_0 = R_{subblock} \cdot \left( 2 \cdot \left\lceil \dfrac{N_{cb}}{8R_{subblock}} \right\rceil \cdot rv_{idx} + 2 \right)$ Set $k = 0$ and $j = 0$
while { $k < E$ }
    if $w_{(k_0+j) \bmod N_{cb}} \neq <NULL>$
        $e_k = w_{(k_0+j) \bmod N_{cb}}$
        $k = k+1$
    end if
    $j = j+1$
end while

FIG. 16

Set $k_0 = R_{subblock} \cdot \left( 2 \cdot \left\lceil \dfrac{N_{cb}}{8R_{subblock}} \right\rceil \cdot rv_{idx} + 2 \right)$ Set $k = 0$ and $j = 0$
while $\{k < E\}$
    if $w_{(k_0+j)\bmod N_{cb}} \neq <NULL>$
        $e_k = w_{(k_0+j)\bmod N_{cb}}$
        $k = k+1$
    end if
    $j = j+1$
end while

FIG. 17

TERMINAL APPARATUS, BASE STATION APPARATUS, COMMUNICATION METHOD, AND INTEGRATED CIRCUIT

TECHNICAL FIELD

The present invention relates to a terminal apparatus, a base station apparatus, a communication method, and an integrated circuit.

This application claims priority based on JP 2016-129851 filed on Jun. 30, 2016, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied (NPL. 1). In LTE, a base station apparatus is also referred to as an evolved NodeB (eNodeB), and a terminal apparatus is also referred to as a User Equipment (UE). LTE is a cellular communication system in which multiple areas are deployed in a cellular structure, with each of the multiple areas being covered by a base station apparatus. In such a cellular communication system, a single base station apparatus may manage multiple cells.

In 3GPP, latency reduction enhancements have been studied. For example, for the latency reduction enhancements, Scheduling request first grant or Pre-scheduled first grant has been studied (NPL. 2).

CITATION LIST

Non Patent Literature

NPL 1: "3GPP TS 36.321 V12.6.0 (2015-06) Evolved Universal Terrestrial Radio Access (E-UTRA); Medium Access Control (MAC) protocol specification (Release 12)", 8 Jul. 2015.

NPL 2: "L2 enhancements to reduce latency", R2-153490, Ericsson, 3GPP TSG-RAN WG2 #91, Beijing, China, 24-28 Aug. 2015.

NPL 3: "Status Report to TSG", RP-161022, Ericsson, 3GPP TSG-RAN meeting #72, Busan, Korea, 13-16 Jun. 2016.

SUMMARY OF INVENTION

Technical Problem

An aspect of the present invention provides a terminal apparatus, a base station apparatus, a communication method, and an integrated circuit, which enable efficient transmission of uplink data.

Solution to Problem (1) To accomplish the object described above, aspects of the present invention are contrived to provide the following measures. Specifically, a terminal apparatus according to an aspect of the present invention includes: at least one processor; and a memory. The at least one processor is configured to and/or programmed to receive, in a first PDCCH, a first uplink grant to which first CRC parity bits scrambled with a C-RNTI for a dynamically scheduled transmission is attached, receive, in a second PDCCH, a second uplink grant to which second CRC parity bits scrambled with a SPS C-RNTI for a semi-persistently scheduled transmission is attached, perform multiple transmissions corresponding to a bundle, based on the first uplink grant or the second uplink grant, and determine a redundancy version corresponding to each of the multiple transmissions, excluding a first transmission of the multiple transmissions, based at least on whether the bundle is associated with the second uplink grant.

(2) A base station apparatus according to an aspect of the present invention includes: at least one processor; and a memory. The at least one processor is configured to and/or programmed to transmit, in a first PDCCH, a first uplink grant to which first CRC parity bits scrambled with a C-RNTI for a dynamically scheduled transmission is attached, transmit, in a second PDCCH, a second uplink grant to which second CRC parity bits scrambled with a SPS C-RNTI for a semi-persistently scheduled transmission is attached, receive multiple transmissions corresponding to a bundle, based on the first uplink grant or the second uplink grant, and determine a redundancy version corresponding to each of the multiple transmissions, excluding a first transmission of the multiple transmissions, based at least on whether the bundle is associated with the second uplink grant.

(3) A communication method for a terminal apparatus according to an aspect of the present invention includes the steps of: receiving, in a first PDCCH, a first uplink grant to which first CRC parity bits scrambled with a C-RNTI for a dynamically scheduled transmission is attached; receiving, in a second PDCCH, a second uplink grant to which second CRC parity bits scrambled with SPS C-RNTI for a semi-persistently scheduled transmission is attached; performing multiple transmissions corresponding to a bundle, based on the first uplink grant or the second uplink grant; and determining a redundancy version corresponding to each of the multiple transmissions, excluding a first transmission of the multiple transmissions, based at least on whether the bundle is associated with the second uplink grant.

(4) A communication method for a base station apparatus according to an aspect of the present invention includes the steps of: transmitting, in a first PDCCH, a first uplink grant to which first CRC parity bits scrambled with a C-RNTI for a dynamically scheduled transmission is attached; transmitting, in a second PDCCH, a second uplink grant to which second CRC parity bits scrambled with a SPS C-RNTI for a semi-persistently scheduled transmission is attached; receiving multiple transmissions corresponding to a bundle, based on the first uplink grant or the second uplink grant; and determining a redundancy version corresponding to each of the multiple transmissions, excluding a first transmission of the multiple transmissions, based at least on whether the bundle is associated with the second uplink grant.

Advantageous Effects of Invention

According to an aspect of the present invention, uplink data can be transmitted efficiently.

BRIEF DESCRIPTION OF DRAWINGS

FIG. 5 is a diagram illustrating an example of Special fields for activation of Semi-Persistent Scheduling according to the present embodiment.

FIG. 6 is a diagram illustrating an example of Special fields for release of the Semi-Persistent Scheduling according to the present embodiment.

FIG. 16 is a diagram illustrating an example of bit selection and pruning according to the present embodiment.

FIG. 17 is a diagram for describing a first method of determining a redundancy version for each transmission in a bundle according to the present embodiment.

DESCRIPTION OF EMBODIMENTS

Embodiments of the present invention will be described below.

Figure 1:
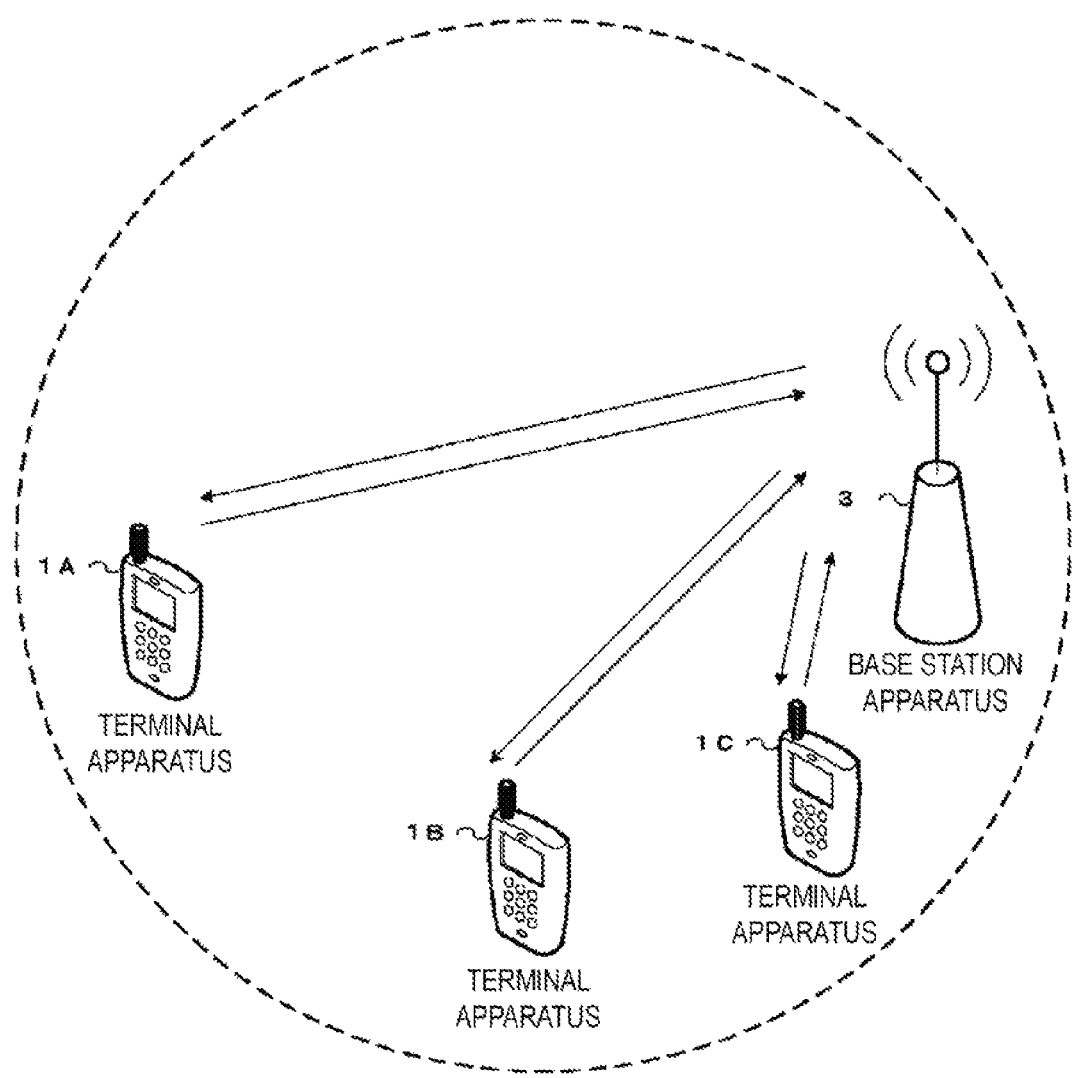
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

Physical channels and physical signals according to the present embodiment will be described.

In FIG. 1, in uplink radio communication from the terminal apparatus 1 to the base station apparatus 3, the following uplink physical channels are used. Here, the uplink physical channels are used to transmit information output from the higher layers.

Physical Uplink Control Channel (PUCCH)
Physical Uplink Shared Channel (PUSCH)
Physical Random Access Channel (PRACH)

The PUCCH is used to transmit Uplink Control Information (UCI).

The PUSCH is used for transmission of uplink data (Uplink-Shared Channel (UL-SCH)).

Here, the base station apparatus 3 and the terminal apparatus 1 exchange (transmit and/or receive) signals with each other in their respective higher layers. For example, the base station apparatus 3 and the terminal apparatus 1 may transmit and/or receive Radio Resource Control (RRC) signaling (also referred to as an RRC message or RRC information) in the RRC layer. The base station apparatus 3 and the terminal apparatus 1 may transmit and receive a Medium Access Control (MAC) control element in a MAC layer, respectively. Here, the RRC signaling and/or the MAC control element is also referred to as higher layer signaling.

The PUSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, user-equipment-specific information (information unique to user equipment) may be transmitted through signaling dedicated to the certain terminal apparatus 1.

The PRACH is used to transmit a random access preamble.

In FIG. 1, the following uplink physical signal is used in the uplink radio communication. Here, the uplink physical signal is not used to transmit information output from the higher layers but is used by the physical layer.

Uplink Reference Signal (UL RS)

According to the present embodiment, the following two types of uplink reference signals are used.

Demodulation Reference Signal (DMRS)
Sounding Reference Signal (SRS)

The DMRS is associated with transmission of the PUSCH or the PUCCH. The DMRS is time-multiplexed with the PUSCH or the PUCCH. The base station apparatus 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station apparatus 3 uses the SRS in order to measure an uplink channel state.

In FIG. 1, the following downlink physical channels are used for downlink radio communication from the base station apparatus 3 to the terminal apparatus 1. Here, the downlink physical channels are used to transmit the information output from the higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used to broadcast a Master Information Block (MIB, Broadcast Channel (BCH)) that is shared by the terminal apparatuses 1.

The PCFICH is used for transmission of information indicating a region (OFDM symbols) to be used for transmission of the PDCCH.

The PHICH is used to transmit an HARQ indicator (HARQ feedback or response information) indicating an ACKnowledgement (ACK) or a Negative ACKnowledgement (NACK) for the uplink data (Uplink Shared Channel (UL-SCH)) received by the base station apparatus 3.

The PDCCH and the EPDCCH are used to transmit Downlink Control Information (DCI). Here, multiple DCI formats are defined for transmission of the downlink control information. In other words, a field for the downlink control information is defined in a DCI format and is mapped to information bits.

For example, downlink DCI formats (e.g., DCI format 1, DCI format 1A and/or DCI format 1C) to be used for the scheduling of one PDSCH in one cell (transmission of a single downlink transport block) may be defined.

Here, each of the downlink DCI formats includes information on the scheduling of the PDSCH. For example, the downlink DCI format includes downlink control information such as a Carrier Indicator Field (CIF), information of an HARQ process number, information of a Modulation and Coding Scheme (MCS), information of a Redundancy version, and/or information of Resource block assignment. Here, the downlink DCI format is also referred to as downlink grant and/or downlink assignment.

Furthermore, for example, uplink DCI formats (e.g., DCI format 0 and DCI format 4) to be used for the scheduling of one PUSCH in one cell (transmission of a single uplink transport block) are defined.

Here, each of the uplink DCI formats includes information on the scheduling of the PUSCH. For example, the uplink DCI format includes downlink control information such as a Carrier Indicator Field (CIF), information of a Transmit Power Command (TPC command) for a scheduled PUSCH, information of Cyclic shift DMRS, information of Modulation and coding scheme (MCS) and/or redundancy version, information of Resource block assignment and/or hopping resource allocation, and/or a New Data Indicator (NDI). Here, the uplink DCI format is also referred to as uplink grant and/or Uplink assignment. The NDI and the redundancy version are also referred to as HARQ information.

In a case that a PDSCH resource is scheduled in accordance with the downlink assignment, the terminal apparatus 1 may receive downlink data on the scheduled PDSCH. In a case that a PUSCH resource is scheduled in accordance with the uplink grant, the terminal apparatus 1 may transmit uplink data and/or uplink control information on the scheduled PUSCH.

Here, an RNTI assigned to the terminal apparatus 1 by the base station apparatus 3 is used for the transmission of the downlink control information (transmission on the PDCCH). Specifically, Cyclic Redundancy check (CRC) parity bits are attached to the DCI format (or downlink control information), and after the attaching, the CRC parity bits are scrambled with the RNTI. Here, the CRC parity bits attached to the DCI format may be obtained from a payload of the DCI format.

The terminal apparatus 1 attempts to decode the DCI format to which the CRC parity bits scrambled with the RNTI are attached, and detects, as a DCI format destined for the terminal apparatus 1 itself, the DCI format for which the CRC has been successful (also referred to as blind coding). In other words, the terminal apparatus 1 may detect the PDCCH with the CRC scrambled with the RNTI. The terminal apparatus 1 may detect the PDCCH including the DCI format to which the CRC parity bits scrambled with the RNTI are attached.

Here, the RNTI may include a Cell-Radio Network Temporary Identifier (C-RNTI). The C-RNTI is an identifier unique to the terminal apparatus 1 and used for the identification in RRC connection and scheduling. The C-RNTI may be used for dynamically scheduled unicast transmission. The uplink grant to which the CRC parity bits scrambled with the C-RNTI are attached is also referred to as a Dynamic Scheduling (DS) grant, an uplink grant associated with the C-RNTI, and an uplink grant addressed to the C-RNTI.

The RNTI may further include a Semi-Persistent Scheduling C-RNTI (SPS C-RNTI). The SPS C-RNTI is an identifier unique to the terminal apparatus 1 and used for Semi-Persistent Scheduling. The SPS C-RNTI may be used for semi-persistently scheduled unicast transmission.

Here, the semi-persistently scheduled transmission also means a periodically scheduled transmission. For example, the SPS C-RNTI may be used for activation, reactivation, and/or retransmission of the semi-persistently scheduled transmission. Hereinafter, the activation may also mean the reactivation and/or the retransmission.

The SPS C-RNTI may be used for release and/or deactivation of the semi-persistently scheduled transmission. Hereinafter, the release may also mean the deactivation. Here, an RNTI may be newly defined for the latency reduction. For example, the SPS C-RNTI in the present embodiment may include an RNTI newly defined for the latency reduction.

The PDSCH is used to transmit downlink data (Downlink Shared Channel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used to transmit multicast data (Multicast Channel (MCH)).

In FIG. 1, the following downlink physical signals are used for downlink radio communication. Here, the downlink physical signals are not used to transmit the information output from the higher layers but is used by the physical layer.

Synchronization signal (SS)
Downlink Reference Signal (DL RS)

The synchronization signal is used for the terminal apparatus 1 to take synchronization in the frequency domain and the time domain in the downlink. In the TDD scheme, the synchronization signal is mapped to subframes 0, 1, 5, and 6 within a radio frame. In the FDD scheme, the synchronization signal is mapped to subframes 0 and 5 within a radio frame.

The downlink reference signal is used for the terminal apparatus 1 to perform channel compensation on a downlink physical channel. The downlink reference signal is used in order for the terminal apparatus 1 to obtain the downlink channel state information.

Here, the downlink physical channel and the downlink physical signal are collectively referred to as a downlink signal. The uplink physical channel and the uplink physical signal are collectively referred to as an uplink signal. The downlink physical channels and the uplink physical channels are collectively referred to as a physical channel. The downlink physical signals and the uplink physical signals are collectively referred to as physical signals.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

Hereinafter, carrier aggregation will be described.

In the present embodiment, one or multiple serving cells may be configured for the terminal apparatus 1. A technology in which the terminal apparatus 1 communicates via the multiple serving cells is referred to as cell aggregation or carrier aggregation.

Here, the present embodiment may apply to one or each of the multiple serving cells configured for the terminal apparatus 1. Alternatively, the present embodiment may apply to one or some of the multiple serving cells configured for the terminal apparatus 1. Alternatively, the present embodiment may apply to one or each of the multiple serving cell groups configured for the terminal apparatus 1.

In the present embodiment, Time Division Duplex (TDD) and/or Frequency Division Duplex (FDD) may be applied. Here, for the carrier aggregation, TDD or FDD may apply to one or all of the multiple serving cells. Alternatively, for the carrier aggregation, serving cells to which TDD applies and serving cells to which FDD applies may be aggregated. Here, a frame structure for FDD is also referred to as Frame structure type 1. A frame structure for TDD is also referred to as Frame structure type 2.

Here, one or multiple configured serving cells may include one primary cell and one or multiple secondary cells. For example, the primary cell may be a serving cell in which an initial connection establishment procedure has been performed, a serving cell in which a connection re-establishment procedure has been initiated, or a cell designated as the primary cell by a handover procedure. Here, upon an RRC connection being established or later, a secondary cell(s) may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal apparatus 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

The size of each of various fields in the time domain is expressed by the number of time unit $T_s=1/(15000*2048)$ sec. The length of a radio frame is $T_s=307200*T_s=10$ ms. Each radio frame includes ten consecutive subframes in the time domain. The length of each subframe is $T_{subframe}=30720*T_s=1$ ms. Each subframe i includes two consecutive slots in the time domain. The two consecutive slots in the time domain are a slot having a slot number $n_s$ of 2i in the radio frame and a slot having a slot number $n_s$ of 2i+1 in the radio frame. The length of each slot is $T_{slot}=153600*n_s=0.5$ ms. Each radio frame includes ten consecutive subframes in the time domain. Each radio frame includes 20 consecutive slots ($n_s=0, 1, \ldots, 19$) in the time domain. In other words, radio frames, subframes, and slots are fields in the time domain. A field in the time domain is also referred to as a Transmission Time Interval (TTI).

A configuration of a slot according to the present embodiment will be described below.

Figure 2:
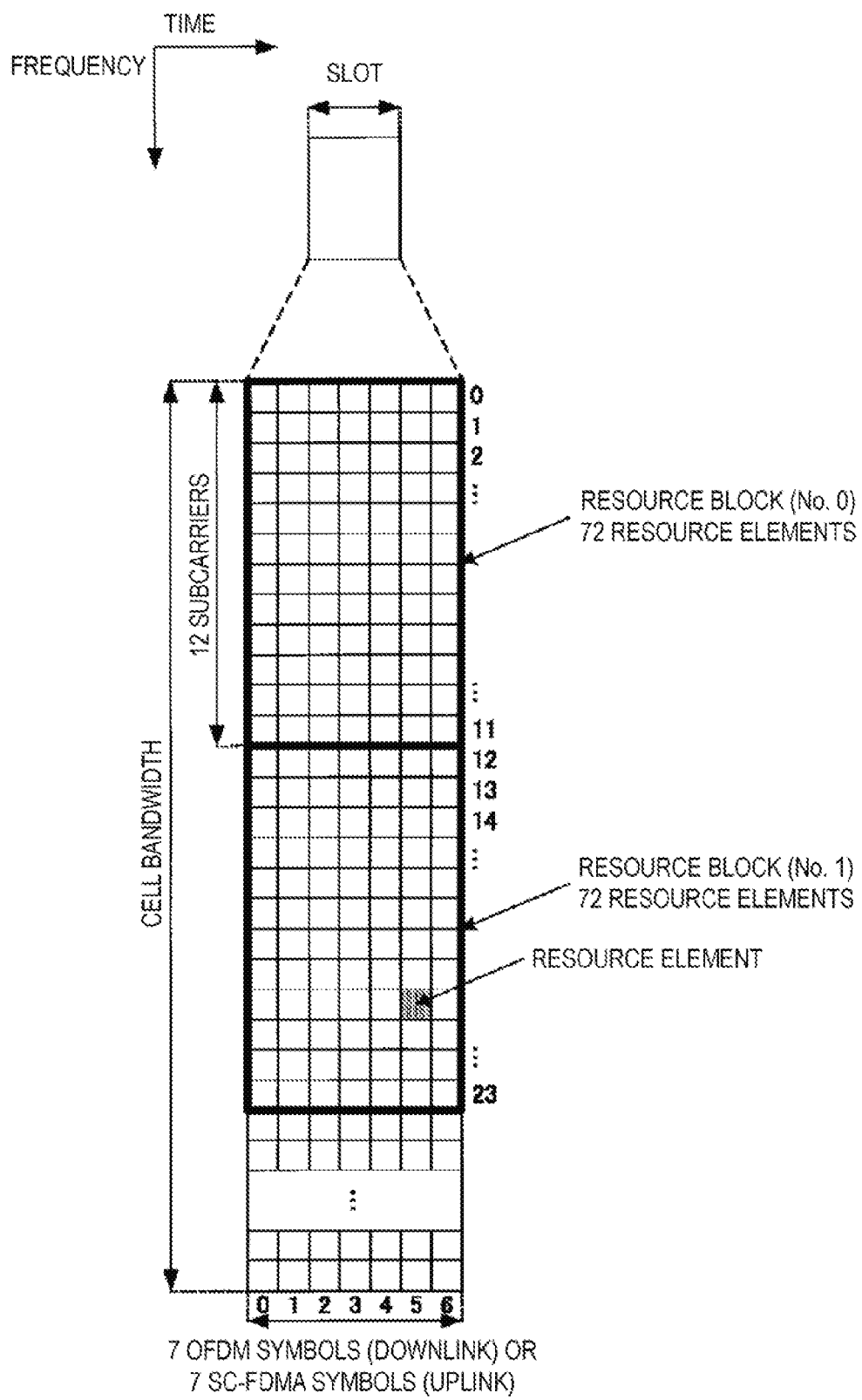
FIG. 2 is a diagram illustrating a configuration of a slot according to the present embodiment.

FIG. 2 is a diagram illustrating the configuration of the slot according to the present embodiment. In FIG. 2, a horizontal axis represents a time axis, and a vertical axis represents a frequency axis. Here, a normal Cyclic Prefix (CP) may apply to an OFDM symbol. Alternatively, an extended Cyclic Prefix (CP) may apply to the OFDM symbol. The physical signal or physical channel transmitted in each of the slots is expressed by a resource grid.

Here, in the downlink, the resource grid may be defined with multiple subcarriers and multiple OFDM symbols. In the uplink, the resource grid may be defined with multiple subcarriers and multiple SC-FDMA symbols. The number of subcarriers constituting one slot may depend on a cell bandwidth. The number of OFDM symbols or SC-FDMA symbols constituting one slot may be seven. Here, each element within the resource grid is referred to as a resource element. The resource element may be identified by a subcarrier number and an OFDM symbol or SC-FDMA symbol number.

Here, a resource block may be used to express mapping of a certain physical channel (PDSCH, PUSCH, or the like) to resource elements. For the resource block, a virtual resource block and a physical resource block may be defined. A certain physical channel may be first mapped to the virtual resource block. Thereafter, the virtual resource block may be mapped to the physical resource block. One physical resource block may be defined with seven consecutive OFDM symbols or SC-FDMA symbols in the time domain and 12 consecutive subcarriers in the frequency domain. Thus, one physical resource block may include (7×12) resource elements. Furthermore, one physical resource block may correspond to one slot in the time domain and correspond to 180 kHz in the frequency domain. The physical resource blocks may be numbered from zero in the frequency domain.

Configurations of apparatuses according to the present embodiment will be described below.

Figure 3:
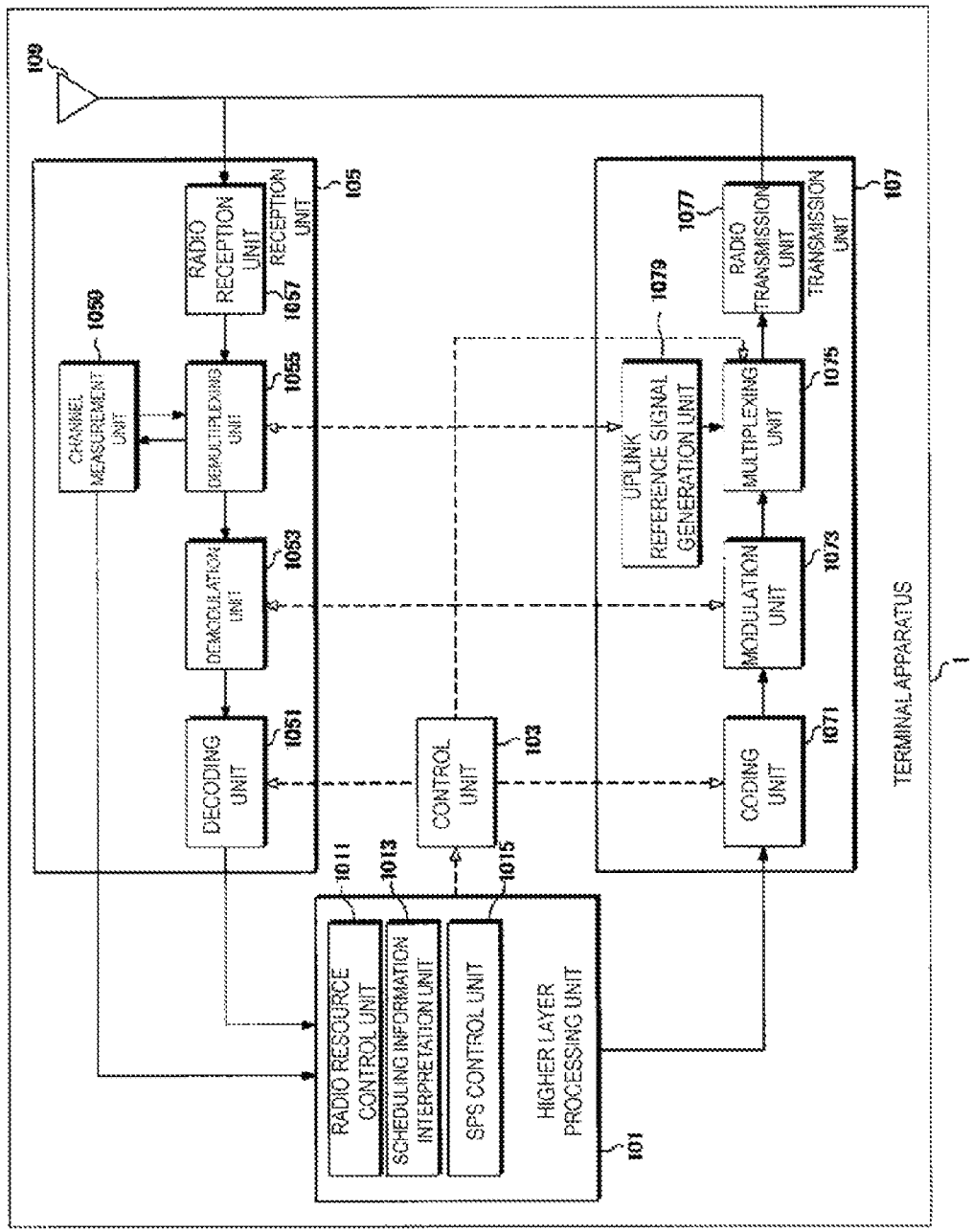
FIG. 3 is a schematic block diagram illustrating a configuration of a terminal apparatus 1 according to the present embodiment.
Figure 12:
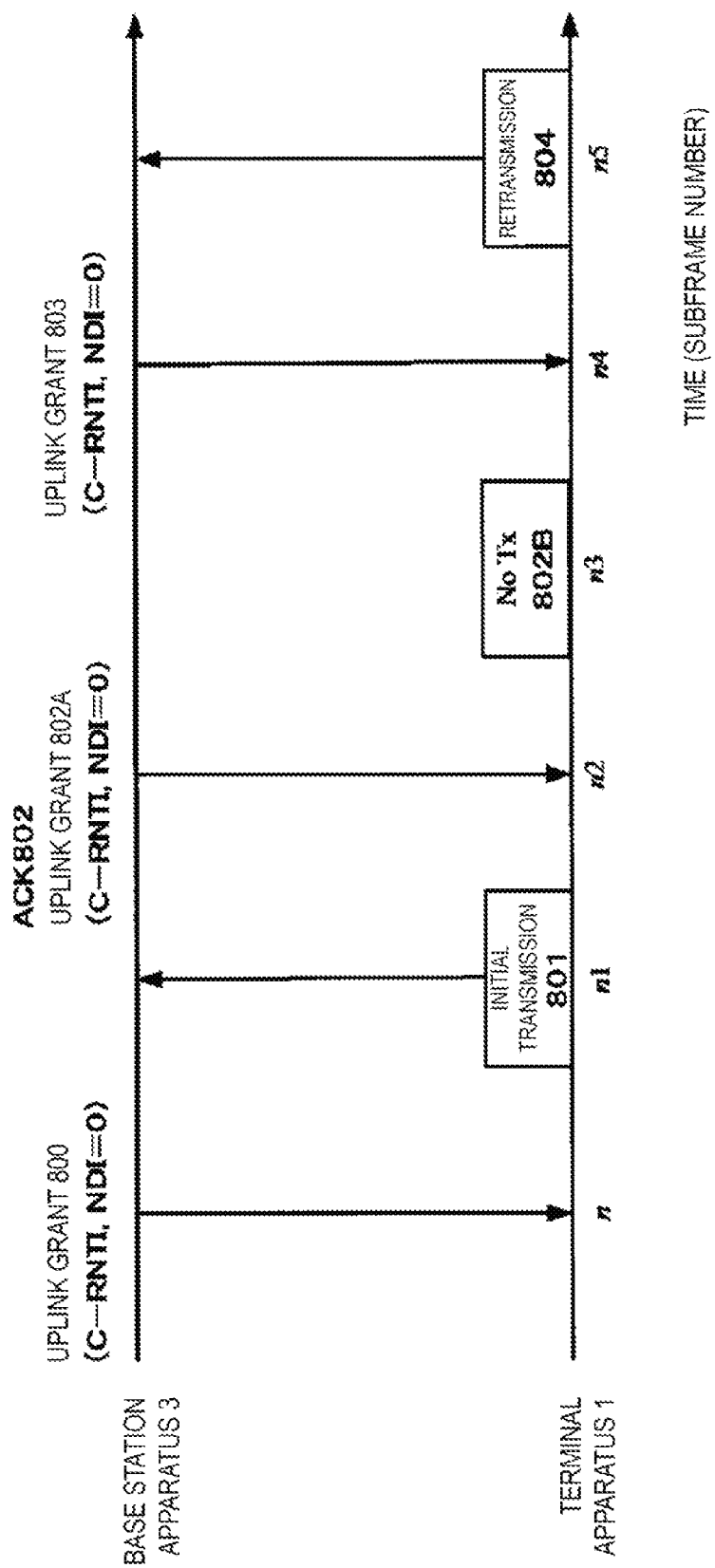
FIG. 12 is a diagram illustrating a third example for describing the NDI according to the present embodiment.

FIG. 3 is a schematic block diagram illustrating a configuration of the terminal apparatus 1 according to the present embodiment. As illustrated in FIG. 12, the terminal apparatus 1 is configured to include a higher layer processing unit 101, a control unit 103, a reception unit 105, a transmission unit 107, and a transmit and receive antenna 109. The higher layer processing unit 101 is configured to include a radio resource control unit 1011, a scheduling information interpretation unit 1013, and a SPS control unit 1015. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various configuration information/parameters of the terminal apparatus 1 itself. The radio resource control unit 1011 sets the various configuration information/parameters in accordance with higher layer signaling received from the base station apparatus 3. To be more specific, the radio resource control unit 1011 sets the various configuration information/parameters in accordance with the information indicating the various configuration information/parameters received from the base station apparatus 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The SPS control unit 1015 included in the higher layer processing unit 101 performs controls concerning the SPS, based on various configuration information, and information or conditions regarding the SPS such as parameters.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station apparatus 3 through the transmit and receive antenna 109, and outputs the information resulting from the decoding, to the higher layer processing unit 101.

The radio reception unit 1057 converts (down-converts) a downlink signal received through the transmit and receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio reception unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal apparatus 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station apparatus 3 through the transmit and receive antenna 109. Furthermore, the transmission unit 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme predetermined in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through Multiple Input Multiple Output Spatial Multiplexing (MIMO SM), and performs precoding on the sequences.

The uplink reference signal generation unit 1079 generates a sequence acquired in accordance with a rule (formula) predetermined in advance, based on a physical layer cell identifier (also referred to as a Physical Cell identity (PCI), a Cell ID, or the like) for identifying the base station apparatus 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 109 for transmission.

Figure 4:
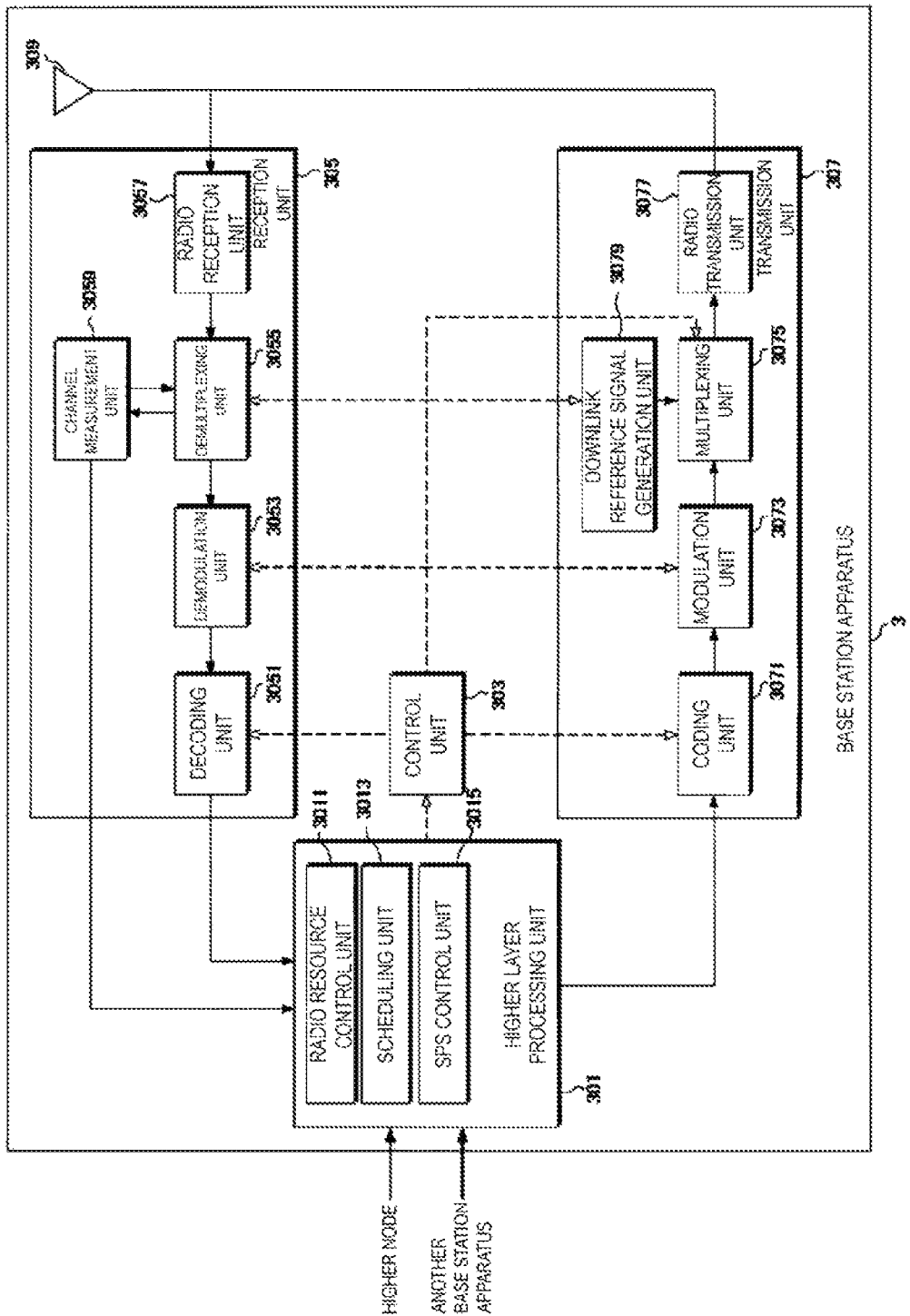
FIG. 4 is a schematic block diagram illustrating a configuration of a base station apparatus 3 according to the present embodiment.

FIG. 4 is a schematic block diagram illustrating a configuration of the base station apparatus 3 according to the present embodiment. As illustrated in the figure, the base station apparatus 3 is configured to include a higher layer processing unit 301, a control unit 303, a reception unit 305, a transmission unit 307, and a transmit and receive antenna 309. The higher layer processing unit 301 is configured to include a radio resource control unit 3011, a scheduling unit 3013, and a SPS control unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmission unit 307. Furthermore, the radio resource control unit 3011 manages various configuration information/parameters for each of the terminal apparatuses 1. The radio resource control unit 3011 may configure various configuration information/parameters for each of the terminal apparatuses 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the channel measurement unit 3059. The scheduling unit 3013 generates the control information (e.g., the DCI format) in order to control the reception unit 305 and the transmission unit 307 in accordance with a result of the scheduling, and outputs the generated information to the control unit 303. The scheduling unit 3013 further determines timing of performing transmission processing and reception processing.

The SPS control unit 3015 included in the higher layer processing unit 301 performs controls concerning the SPS, based on various configuration information, and information or conditions regarding the SPS such as parameters.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal apparatus 1 through the transmit and receive antenna 309, and outputs information resulting from the decoding to the higher layer processing unit 301. The radio reception unit 3057 converts (down-converts) an uplink signal received through the transmit and receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The reception unit 305 receives the uplink control information.

The radio reception unit 3057 removes a portion corresponding to a Cyclic Prefix (CP) from the digital signal resulting from the conversion. The radio reception unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme predetermined in advance, such as Binary Phase Shift Keying (BPSK), QPSK, 16 QAM, or 64 QAM, or in compliance with the modulation scheme that the base station apparatus 3 itself notified in advance with the uplink grant each of the terminal apparatuses 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal apparatuses 1 and information designating the precoding to be performed on the sequences.

The decoding unit 3051 decodes the coded bits of the PUCCH and the PUSCH, which have been demodulated, at the coding rate in compliance with a coding scheme predetermined in advance, the coding rate being predetermined in advance or being notified in advance with the uplink grant to the terminal apparatus 1 by the base station apparatus 3 itself, and outputs the decoded uplink data and uplink control information to the higher layer processing unit 101. In a case where the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal apparatus 1 through the transmit and receive antenna 309.

The coding unit 3071 codes the HARQ indicator, the downlink control information, and the downlink data that are input from the higher layer processing unit 301, in compliance with the coding scheme predetermined in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme predetermined in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal apparatus 1 and that is acquired in accordance with a rule predetermined in advance, based on the Physical layer Cell Identifier (PCI) for identifying the base station apparatus 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and receive antenna 309 for transmission.

In the present embodiment, for the description of the processing in the terminal apparatus 1, described are processing of the MAC entity in the terminal apparatus 1, a "Multiplexing and assembly" entity in the terminal apparatus 1 (hereinafter, also referred to as a first entity), and/or an HARQ entity in the terminal apparatus 1. In other words, the present embodiment describes the processing of the MAC entity in the terminal apparatus 1, the first entity in the terminal apparatus 1, and/or the HARQ entity in the terminal apparatus 1, but, needless to say, the processing in the present embodiment is the processing in the terminal apparatus 1. The higher layer processing unit 101 may perform the processing of the MAC entity in the terminal apparatus 1, the HARQ entity in the terminal apparatus 1, and the first entity in the terminal apparatus 1. Each entity may be configured as an entity unit. The HARQ entity manages at least one HARQ process.

The present embodiment basically describes behavior (processing) of the terminal apparatus 1, but, needless to say, the base station apparatus 3 performs similar behavior (processing) correspondingly to the behavior (processing) of the terminal apparatus 1.

Each of the terminal apparatus 1 and the base station apparatus 3 may include at least one processor and a memory. The at least one processor and the memory may have the functions of the above-described units of the terminal apparatus 1 or the above-described units of the base station apparatus 3.

Here, the transmission on the PUSCH (which may be transmission on the UL-SCH) is performed at a timing based on a System Frame Number (SFN) and the subframe. To be more specific, in order to specify the timing for the transmission on the PUSCH, the SFN and a subframe number/index in the radio frame corresponding to the SFN are needed. Here, the SFN is a number/index of a radio frame.

Hereinafter, for the purpose of simple description, the SFN (radio frame) and subframe transmitted on the PUSCH are also simply described as the subframe. In other words, the subframe in the following description may also mean the SFN (radio frame) and subframe.

Here, the base station apparatus 3 may configure an interval (period) of the uplink Semi-Persistent Scheduling for the terminal apparatus 1. For example, the base station apparatus 3 may transmit a first parameter and/or second parameter for indicating a value of the interval of the uplink Semi-Persistent Scheduling to the terminal apparatus 1 by including the parameters in higher layer signaling (RRC message).

For example, the base station apparatus 3 may use the first parameter and/or second parameter to configure the interval value of the Semi-Persistent Scheduling as 10 (10 subframes), 20 (20 subframes), 32 (32 subframes), 40 (40 subframes), 64 (64 subframes), 80 (80 subframes), 128 (128 subframes), 160 (160 subframes), 320 (320 subframes), and/or 640 (640 subframes).

The base station apparatus 3 may use the first parameter and/or second parameter to configure the interval value of the Semi-Persistent Scheduling as 1 (1 subframe), 10 (10 subframes), 20 (20 subframes), 32 (32 subframes), 40 (40 subframes), 64 (64 subframes), 80 (80 subframes), 128 (128 subframes), 160 (160 subframes), 320 (320 subframes), and/or 640 (640 subframes).

To be more specific, the base station apparatus 3 may use the first parameter and/or second parameter to configure the interval value of the Semi-Persistent Scheduling as 1 (1 subframe).

For example, the first parameter and/or the second parameter may be configured for each serving cell. The first parameter may be configured for the primary cell. The second parameter may be configured for the primary cell and/or the secondary cell (may be configured for each serving cell). The interval value of the Semi-Persistent Scheduling, "1 (1 subframe)", may be configured for the primary cell and/or the secondary cell (may be configured for each serving cell).

The base station apparatus 3 may use the uplink DCI format (e.g., DCI format 0) to allocate a semi-persistent (semi-permanent, semi-persistent or periodical) PUSCH resource (physical resource block) to the terminal apparatus 1, and instruct the terminal apparatus 1 to activate the transmission on the semi-persistent PUSCH. The base station apparatus 3 may use the uplink DCI format to instruct the terminal apparatus 1 to release the semi-persistent PUSCH resource.

For example, in a case that CRC parity bits attached to the DCI format are scrambled with the SPS C-RNTI, and a NDI field included within the DCI format is set to '0', the terminal apparatus 1 may verify (confirm or check) whether multiple information fields included within the DCI format are set to specific values. To be more specific, the CRC parity bits attached to the DCI format scrambled with the SPS C-RNTI and the NDI field may be used for validation of the Semi-Persistent Scheduling.

Here, in a case that the verification is successful, the terminal apparatus 1 may consider (recognize) that the received DCI format indicates a valid semi-persistent activation or a valid semi-persistent release. In a case that the verification is not successful, the terminal apparatus 1 may discard (clear) this DCI format.

Here, the semi-persistent activation may also mean the activation of the Semi-Persistent Scheduling. The semi-persistent activation may also mean the semi-persistent allocation of the PUSCH resource. The semi-persistent release may also mean release of the Semi-Persistent Scheduling.

To be more specific, the DCI format may be used to indicate the activation of semi-persistent uplink scheduling. The DCI format may be used to enable activation of the Semi-Persistent Scheduling. The DCI format may be used to indicate the semi-persistent release.

FIG. 5 is a diagram illustrating an example of Special fields for activation of the Semi-Persistent Scheduling according to the present embodiment. As illustrated in FIG. 5, multiple fields may be defined for activation of the Semi-Persistent Scheduling. A predetermined value (that may be a specific value) set in each of multiple fields may be defined for activation of the Semi-Persistent Scheduling.

As illustrated in FIG. 5, for example, in a case that the uplink DCI format (e.g., DCI format 0) is used for activation of the Semi-Persistent Scheduling, a field of information on the TPC command for the scheduled PUSCH included within the uplink DCI format may be set to '00', a field of information on the Cyclic shift DMRS may be set to '000', and the most significant bit (MSB) of a field of information on the Modulation and coding scheme (MCS) and redundancy version may be set to '0'.

For example, in a case that the downlink DCI format (e.g., DCI format 1 and/or DCI format 1A) is used for activation of the Semi-Persistent Scheduling, a field of information of an HARQ process number included within the downlink DCI format may be set to '000 (for FDD)' or '0000 (for TDD)', the Most Significant Bit (MSB) of a field of information on the Modulation and Coding scheme (MCS) may be set to '0', and a field of information on the redundancy version may be set to '00'.

In other words, in a case that each of multiple information fields included within the DCI format is set to a specific value defined in advance, the terminal apparatus 1 may activate the Semi-Persistent Scheduling. Here, it is needless to say that multiple information fields and predetermined values to which the information fields are set which are used for activation of the Semi-Persistent Scheduling are not limited to the examples described above. For example, multiple information fields and predetermined values to which the information fields are set which are used for activation of the Semi-Persistent Scheduling may be defined by specifications or the like in advance to be used as information known to both the base station apparatus 3 and the terminal apparatus 1.

FIG. 6 is a diagram illustrating an example of Special fields for release of the Semi-Persistent Scheduling according to the present embodiment. As illustrated in FIG. 6, multiple fields may be defined for release of the Semi-Persistent Scheduling. A predetermined value (that may be a specific value) set in each of multiple fields may be defined for release of the Semi-Persistent Scheduling.

As illustrated in FIG. 6, for example, in a case that the uplink DCI format (e.g., DCI format 0) is used for release of the Semi-Persistent Scheduling, the field of the information on the TPC command for the scheduled PUSCH included within the uplink DCI format may be set to '00', the field of the information on the Cyclic shift DMRS may be set to '000', the field of the information on the Modulation and coding scheme (MCS) and redundancy version may be set to '11111', and a field of information of Resource block assignment and hopping resource allocation (that may be all fields of multiple fields) may be set to '1'.

In other words, in a case that the uplink DCI format is used for release of the Semi-Persistent Scheduling, the field associated with the resource block assignment (resource allocation) may be set to a value defined in advance for release.

For example, in a case that the downlink DCI format (e.g., DCI format 1 and/or DCI format 1A) is used for release of the Semi-Persistent Scheduling, the field of the information on the HARQ process number included within the downlink DCI format may be set to '000 (for FDD)' or '0000 (for TDD)', the field of the information on the Modulation and Coding scheme (MCS) may be set to '11111', the field of the information on the redundancy version may be set to '00', and the field of the information on the Resource block assignment (that may be all fields of multiple fields) may be set to '1'.

In other words, in a case that the downlink DCI format is used for release of the Semi-Persistent Scheduling, the field associated with the resource block assignment (resource allocation) may be set to a value defined in advance for release.

In other words, in the case that each of multiple information fields included within the DCI format is set to a specific value defined in advance, the terminal apparatus 1 may release the Semi-Persistent Scheduling. Here, it is needless to say that multiple information fields and predetermined values to which the information fields are set which are used for release of the Semi-Persistent Scheduling are not limited to the examples described above. For example, multiple information fields and predetermined values to which the information fields are set which are used for release of the Semi-Persistent Scheduling may be defined by specification or the like in advance to be used as information known to both the base station apparatus 3 and the terminal apparatus 1.

Here, the Semi-Persistent Scheduling may be supported only in the primary cell and the primary secondary cell. To be more specific, the DCI format to which the CRC parity bits scrambled with the SPS C-RNTI are attached may be transmitted only to the primary cell and the primary secondary cell. The DCI format to which the CRC parity bits scrambled with the C-RNTI are attached may be transmitted to the primary cell, the primary secondary cell, and/or the secondary cell(s).

For example, the DCI format to which the CRC parity bits scrambled with the SPS C-RNTI are attached may be transmitted to the secondary cell in a case that the interval value of the Semi-Persistent Scheduling as "1 (1 subframe)" is configured for the secondary cell.

Here, the terminal apparatus 1 has to have a valid uplink grant for performing the transmission on the UL-SCH (transmission on the UL-SCH via the PUSCH, and/or UL-SCH transmission on the PUSCH). Here, the uplink grant may also mean that uplink transmission in a certain subframe is granted (permitted, or given).

For example, the valid uplink grant may be dynamically received on the PDCCH. To be more specific, the valid uplink grant may be indicated using the DCI format to which the CRC parity bits scrambled with the C-RNTI are attached. The valid uplink grant may be semi-permanently configured. To be more specific, the valid uplink grant may be indicated using the DCI format to which the CRC parity bits scrambled with the SPS C-RNTI are attached.

The terminal apparatus 1 may store the uplink grant dynamically received on the PDCCH and/or the semi-permanently configured uplink grant. Here, the HARQ entity may deliver the uplink grant dynamically received on the PDCCH and/or the semi-permanently configured uplink grant to an HARQ process, and the HARQ process may store the uplink grant received from the HARQ entity. Hereinafter, the uplink grant dynamically received on the PDCCH and/or semi-permanently configured uplink grant which are to be stored are referred to as a stored uplink grant.

In the case of being instructed to perform the semi-persistent activation, the terminal apparatus 1 (MAC entity) may store the DCI format received from the base station apparatus 3 as a configured uplink grant. Here, the configured uplink grant may be referred to as a configured Semi-persistent scheduling uplink grant (SPS UL grant), a configured grant), and/or an uplink grant addressed to the SPS C-RNTI. The configured uplink grant may be referred to as a configured uplink grant, a configured Semi-persistent scheduling uplink grant (SPS UL grant), or a configured grant.

Here, based on that the UpLink grant (SPS UL grant) stored by the MAC entity is cleared, the UpLink grant (SPS UL grant) stored by the HARQ process may not be cleared. To be more specific, even in a case that the UpLink grant (SPS UL grant) stored by the MAC entity is cleared, retransmission on the semi-persistent PUSCH can be continued based on the UpLink grant (SPS UL grant) stored by the HARQ process.

The Semi-Persistent Scheduling uplink grant may be referred to as a SPS uplink grant, a Semi-persistent grant, a Semi-persistent scheduling assignment, and/or an uplink grant addressed to the SPS C-RNTI.

The base station apparatus 3 may configure validation and/or invalidation of the Semi-Persistent Scheduling for the terminal apparatus 1. For example, the base station apparatus 3 may configure validation and/or invalidation of the Semi-Persistent Scheduling by using higher layer signaling (e.g., RRC layer signaling).

In a case that the Semi-Persistent Scheduling is validated, the SPS C-RNTI, a parameter for indicating the interval value of the uplink Semi-Persistent Scheduling, a parameter for indicating the Number of empty transmissions before release (also referred to as a third parameter), and/or a SPS deactivation timer (also referred to as a fourth parameter) may be at least provided (configured). Here, the empty transmission (also referred to as transmission of empty) is described later. The third parameter and the fourth parameter are described later.

Here, for example, the terminal apparatus 1 starts transmission of a certain subframe on the semi-persistent PUSCH, and then, may initialize or reinitialize the configured uplink grant such that the transmission on the semi-persistent PUSCH recurs based on Equation (1). To be more specific, the terminal apparatus 1 may sequentially consider that the configured uplink grant occurs in a subframe satisfying Equation (1).

Equation (1)

$$(10*SFN+\text{subframe}) = [(10*SFN_{start\_time}+\text{subframe}_{start\_time})+N*\text{semiPersistSchedIntervalUL}+\text{Subframe\_Offset}*(N \bmod 2)] \bmod 10240$$

In other words, the terminal apparatus 1, after configuring the SPS uplink grant, may set a value of Subframe_Offset, and recognize (consider sequentially) that the N-th grant (configured uplink grant, SPS uplink grant) occurs in the subframe specified based on Equation (1). The terminal apparatus 1 (MAC entity) may deliver the SPS uplink grant for a subframe satisfying Equation (1) to the HARQ entity.

Here, the subframe satisfying Equation (1) is also referred to as a subframe satisfying a predetermined condition. The subframes among the subframes satisfying Equation (1) except for the first subframe are also referred to as subframes satisfying a predetermined condition. Here, the first subframe among the subframe satisfying Equation (1) may be a received subframe of the DCI which is used to indicate the activation or reactivation or release of the Semi-Persistent Scheduling.

Specifically, the terminal apparatus 1 may specify the subframe for the transmission on the PUSCH corresponding to the N-th configured uplink grant, based on Equation (1), after configuring the stored DCI format as the SPS uplink grant. Here, in Equation (1), SFN and subframe represent the SFN and subframe, respectively, transmitted on the PUSCH.

In Equation (1), $SFN_{start\_time}$ and $\text{subframe}_{start\_time}$ represent the SFN and the subframe, respectively, at the time configured uplink grant is initialized or reinitialized. To be more specific, $SFN_{start\_time}$ and $\text{subframe}_{start\_time}$ represent, the SFN and subframe starting the transmission on the PUSCH, based on the configured uplink grant (i.e., the subframe for an initial transmission on the PUSCH corresponding to the 0-th configured uplink grant).

In Equation (1), semiPersistSchedIntervalUL represents the interval of the uplink Semi-Persistent Scheduling. In Equation (1), Subframe_Offset represents an offset value used to specify the subframe for the transmission on the PUSCH.

Here, the terminal apparatus 1 may set Subframe_Offset in Equation (1) to '0' in a case that a parameter (twoIntervalConfig) is not validated by higher layer after configuring the SPS uplink grant.

The initialization may be performed in a case that the Semi-Persistent Scheduling is not activated. The reinitialization may be performed in a case that the Semi-Persistent Scheduling is already activated. Here, the initialization may also mean initial configuration, and the reinitialization may also mean re-initial configuration. In other words, the terminal apparatus 1 may initialize or reinitialize the configured uplink grant to start the transmission on the PUSCH in a certain subframe.

Figure 7:
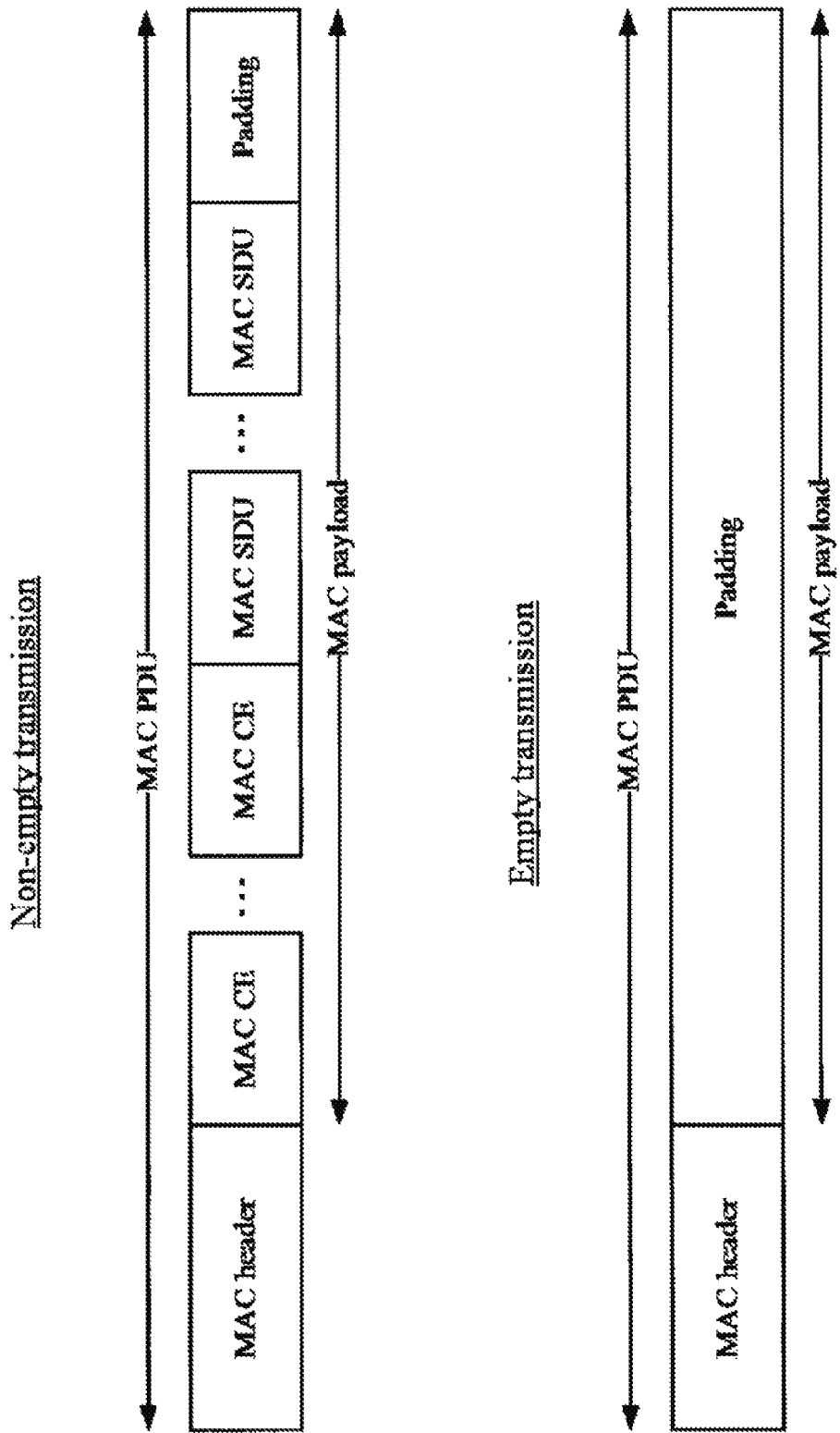
FIG. 7 is a diagram for describing examples of Non-empty transmission and Empty transmission according to the present embodiment.

FIG. 7 is a diagram for describing examples of Non-empty transmission and Empty transmission according to the present embodiment. As illustrated in FIG. 7, a MAC Protocol Data Unit (MAC PDU) may be constituted by a MAC header, a MAC Service Data Unit (MAC SDU), a MAC Control Element (MAC CE), and padding (padding bits). Here, the MAC protocol data unit may correspond to the uplink data (UL-SCH).

Here, there may be defined, as the MAC control element, multiple MAC control elements including at least a Buffer Status Report MAC control element (Buffer Status Report MAC CE, BSR MAC CE, which is a MAC control element used for buffer status report), a Timing Advance Command MAC control element (Timing Advance Command MAC CE, TAC MAC CE, which is a MAC control element used to transmit a timing advance command), a Power Headroom Report MAC control element (Power Headroom Report MAC CE, PHR MAC CE, which is a MAC control element used for power headroom report), and/or an Activation/Deactivation MAC control element (Activation/Deactivation MAC CE, which is a MAC control element used to transmit an activation/deactivation command).

There may be defined, as the buffer status report, multiple buffer status reports including at least a Regular BSR, a Periodic BSR, and a padding BSR. For example, the Regular BSR, the Periodic BSR, and the padding BSR may be triggered based on events (conditions) different from each other.

For example, the Regular BSR may be triggered in a case that data for a logical channel which belongs to a certain Logical Channel Group (LCG) becomes available for transmission, and priority for the transmission of the data is higher than the logical channels which belong to any LCG and for which data is already available for transmission, or in a case that there is no available data for transmission on the logical channels which belong to any LCG. The Regular BSR may also be triggered in a case that a predetermined timer (retxBSR-Timer) expires, and the terminal apparatus 1 has available data for transmission for the logical channels which belong to a certain LCG.

The Periodic BSR may be triggered in a case that a predetermined timer (periodic BSR-Timer) expires. The padding BSR may be triggered in a case that the UL-SCH is allocated, and the number of padding bits is equal to or larger than a size of the Buffer Status Report MAC control element plus its subheader.

The terminal apparatus 1 may use the buffer status report to notify the base station apparatus 3 of a transmission data buffer size of the uplink data corresponding to each LCG as a message in the MAC layer.

As illustrated in FIG. 7, the MAC protocol data unit may contain zero, one, or multiple MAC service data units. The MAC protocol data unit may contain zero, one, or multiple MAC control elements. Padding may occur at the end of the MAC Protocol Data Unit (MAC PDU).

Here, the non-empty transmission may be transmission of the MAC protocol data unit including at least one or multiple MAC service data units (or may correspond to transmission of MAC protocol data unit including at least one or multiple MAC service data units).

The non-empty transmission may be transmission of the MAC protocol data unit including at least one or multiple first MAC control elements (or may correspond to transmission of the MAC protocol data unit including at least one or multiple first MAC control elements). Here, the first MAC control element (or a first predetermined MAC control element) may be defined in advance by specifications or the like, and may be information known to both the base station apparatus 3 and the terminal apparatus 1.

For example, the first MAC control element may contain one or all of the multiple MAC control elements described above. For example, the first MAC control element may be a Power Headroom Report MAC control element. For example, the first MAC control element may be a Buffer Status Report MAC control element including a Regular BSR. The first MAC control element may be a Buffer Status Report MAC control element including a Periodic BSR.

To be more specific, the non-empty transmission may be transmission of the MAC protocol data unit including one or multiple MAC service data units and/or one or multiple first MAC control elements (or may correspond to transmission of the MAC protocol data unit including at least one or multiple MAC service data units and/or one or multiple first MAC control elements).

The empty transmission may be transmission of the MAC protocol data unit including only padding (or may correspond to transmission of the MAC protocol data unit including only padding). Here, the MAC header is attached to the transmission of the MAC protocol data unit including only padding.

The empty transmission may be transmission of the MAC protocol data unit including one or multiple second MAC control elements (or may correspond to transmission of the MAC protocol data unit including at least one or multiple second MAC control elements). Here, the second MAC control element (or a second predetermined MAC control element) may be defined in advance by specifications or the like, and may be information known to both the base station apparatus 3 and the terminal apparatus 1.

Here, the second MAC control element may be a MAC control element other than the first MAC control element. For example, the second MAC control element may contain one or all of the multiple MAC control elements described above. For example, the second MAC control element may be a Buffer Status Report MAC control element including a padding BSR.

To be more specific, the empty transmission may be transmission of the MAC protocol data unit including padding and/or only one or multiple second MAC control elements (or may correspond to transmission of the MAC protocol data unit including only padding and/or one or multiple second MAC control elements).

Here, the non-empty transmission and/or the empty transmission may be transmission corresponding to a new transmission. To be more specific, transmitting, in the new transmission, the MAC protocol data unit including at least one or multiple MAC service data units and/or one or multiple first MAC control elements may be referred to as the non-empty transmission. Transmitting, in the new transmission, the MAC protocol data unit including only padding and/or one or multiple second MAC control elements may be referred to as the empty transmission.

The non-empty transmission and/or the empty transmission may be performed on the PUSCH scheduled by the base station apparatus 3. For example, the non-empty transmission and/or the empty transmission may be performed on the PUSCH scheduled by using the DCI (DCI format) to which the CRC parity bits scrambled with the C-RNTI are attached (i.e., dynamically scheduled PUSCH resource). The non-empty transmission and/or the empty transmission may be performed on the PUSCH scheduled by using the DCI (DCI format) to which the CRC parity bits scrambled with the SPS C-RNTI are attached (i.e., semi-permanently scheduled PUSCH resource).

As described above, the terminal apparatus 1 may semi-permanently (semi-persistently or periodically) perform the transmission on the PUSCH (transmission on the UL-SCH) in the subframe specified based on Equation (1). Here, the terminal apparatus 1 may clear the configured grant based on the third parameter (parameter for indicating the Number of empty transmissions before release) configured by the base station apparatus 3.

For example, the terminal apparatus 1 may clear the configured grant in a case that the number of consecutive empty transmissions corresponding to the initial transmission on the semi-persistent PUSCH reaches a value indicated by using the third parameter (the number of transmissions).

To be more specific, the terminal apparatus 1 may clear the configured grant immediately after the third parameter corresponding to the number of consecutive new MAC Protocol Data Units (PDUs) each of which contains no MAC service data unit (i.e., each of which contains zero MAC SDUs). Here, the number of the consecutive empty transmissions corresponding to the initial transmission include the number of empty transmissions on the Semi-Persistent Scheduling resource. Here, the number of the consecutive empty transmissions corresponding to the initial transmission does not include the number of empty transmissions on the dynamically scheduled PUSCH resource.

Here, the terminal apparatus 1 may release (clear) the uplink resource allocated by the base station apparatus 3 (Semi-Persistent Scheduling resource, PUSCH resource), based on the third parameter. Specifically, the terminal apparatus 1 may release the uplink resource allocated by the base station apparatus 3 similarly to clearing the configured grant, based on the third parameter. Here, the terminal apparatus 1, in a case of receiving the DCI format which is used to indicate the release of the Semi-Persistent Scheduling described above, may clear the configured grant and/or release the uplink resource.

Hereinafter, a first behavior refers to a behavior in which the terminal apparatus 1 transmits the uplink data, and clears the configured grant and/or releases the uplink resource, based on the third parameter as described above. The first behavior also refers to a behavior in which the terminal apparatus 1 transmits the uplink data, and clears the configured grant and/or releases the uplink resource in the case of receiving the DCI format which is used to indicate the release of the Semi-Persistent Scheduling as described above.

Here, in the first behavior, the terminal apparatus 1 immediately clears the configured grant and/or releases the uplink resource in the case of receiving the DCI format which is used to indicate the release of the Semi-Persistent Scheduling. To be more specific, the terminal apparatus 1 immediately clears the configured grant and/or releases the uplink resource without transmitting any information to the base station 3 in the case of receiving the DCI format which is used to indicate the release of the Semi-Persistent Scheduling.

Figure 8:
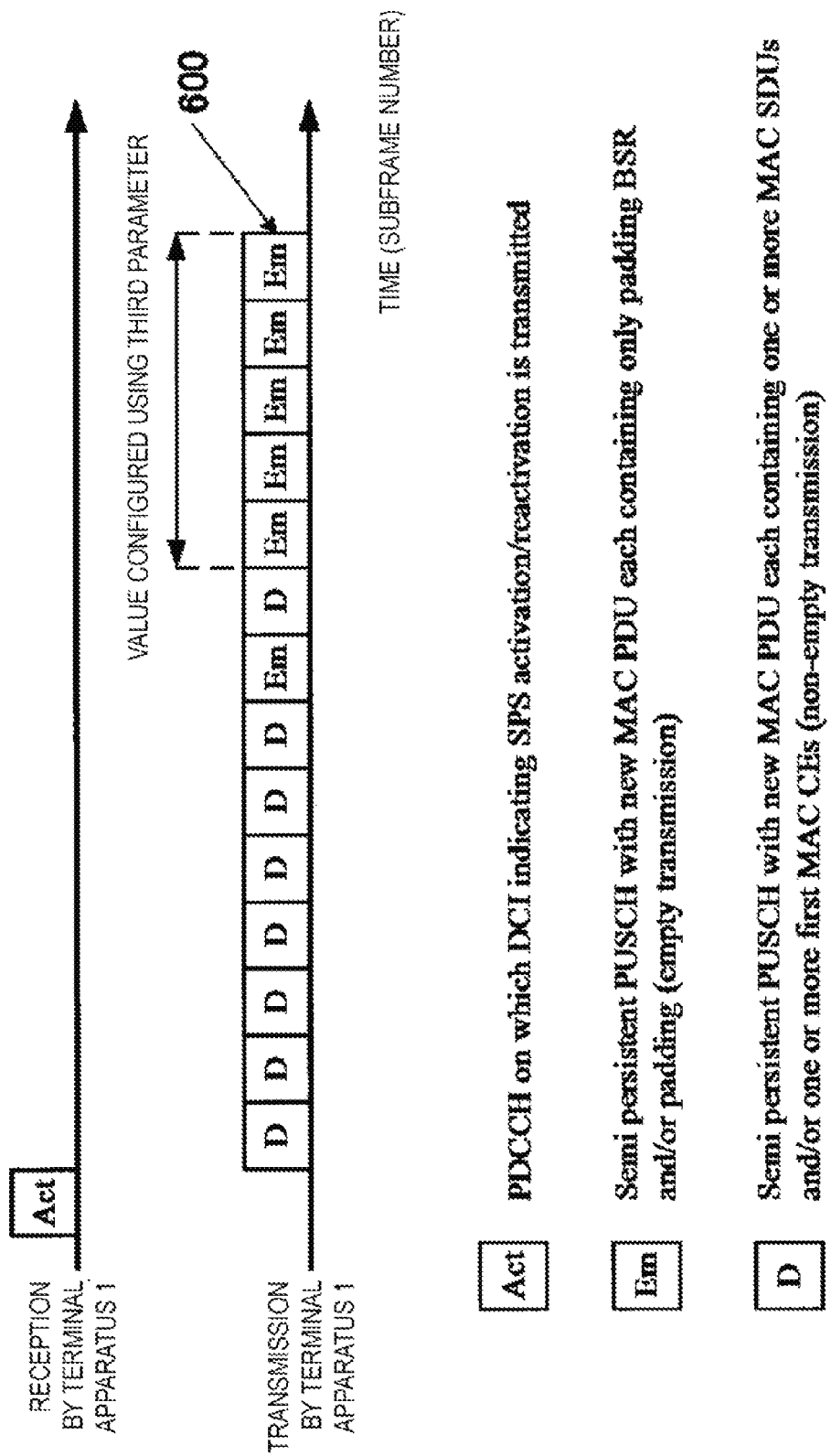
FIG. 8 is a diagram for describing a method for clearing a configured grant in a first behavior according to the present embodiment.

FIG. 8 is a diagram for describing a method of clearing a configured grant in a first behavior according to the present embodiment. Here, FIG. 8 illustrates a behavior in the case that the interval value of the Semi-Persistent Scheduling is configured to be "1 (1 subframe)".

As illustrated in FIG. 8, the terminal apparatus 1 may receive the DCI to be used to indicate activation and/or reactivation of the Semi-Persistent Scheduling. The terminal apparatus 1 may perform the non-empty transmission on the Semi-Persistent Scheduling resource. To be more specific, the terminal apparatus 1 may perform the non-empty transmission based on the configured uplink grant according to Equation (1) described above. The terminal apparatus 1 may perform the empty transmission on the Semi-Persistent Scheduling resource. To be more specific, the terminal apparatus 1 may perform the empty transmission using the Semi-Persistent Scheduling resource, in a case of having no available data for transmission.

A case of having no available data for transmission may be (i) a case that only padding BSR is available for transmission or (ii) a case that only padding BSR and padding are available for transmission. A case of having data available for transmission may be (i) the case that NOT "only padding BSR is available for transmission", (ii) the case that NOT "only padding BSR and padding are available for transmission (the case that NOT "only padding BSR is available for transmission"), (iii) the case that the state is NOT a "state where only padding BSR is available for transmission", or (iv) the case that the state is NOT a state where "only padding BSR and padding are available for transmission". Here, the padding BSR may be the second MAC control element.

In 600 in FIG. 8, the terminal apparatus 1 may clear the configured grant in a case that the number of consecutive empty transmissions using the Semi-Persistent Scheduling resource reaches the value configured by using the third parameter (the number of transmissions). The terminal apparatus 1 may release the uplink resource (Semi-Persistent Scheduling resource) in the case that the number of consecutive empty transmissions on the Semi-Persistent Scheduling resource reaches the value configured by using the third parameter (the number of transmissions). Specifically, the terminal apparatus 1 may clear the configured grant and/or release the uplink resource, based on the third parameter.

Figure 9:
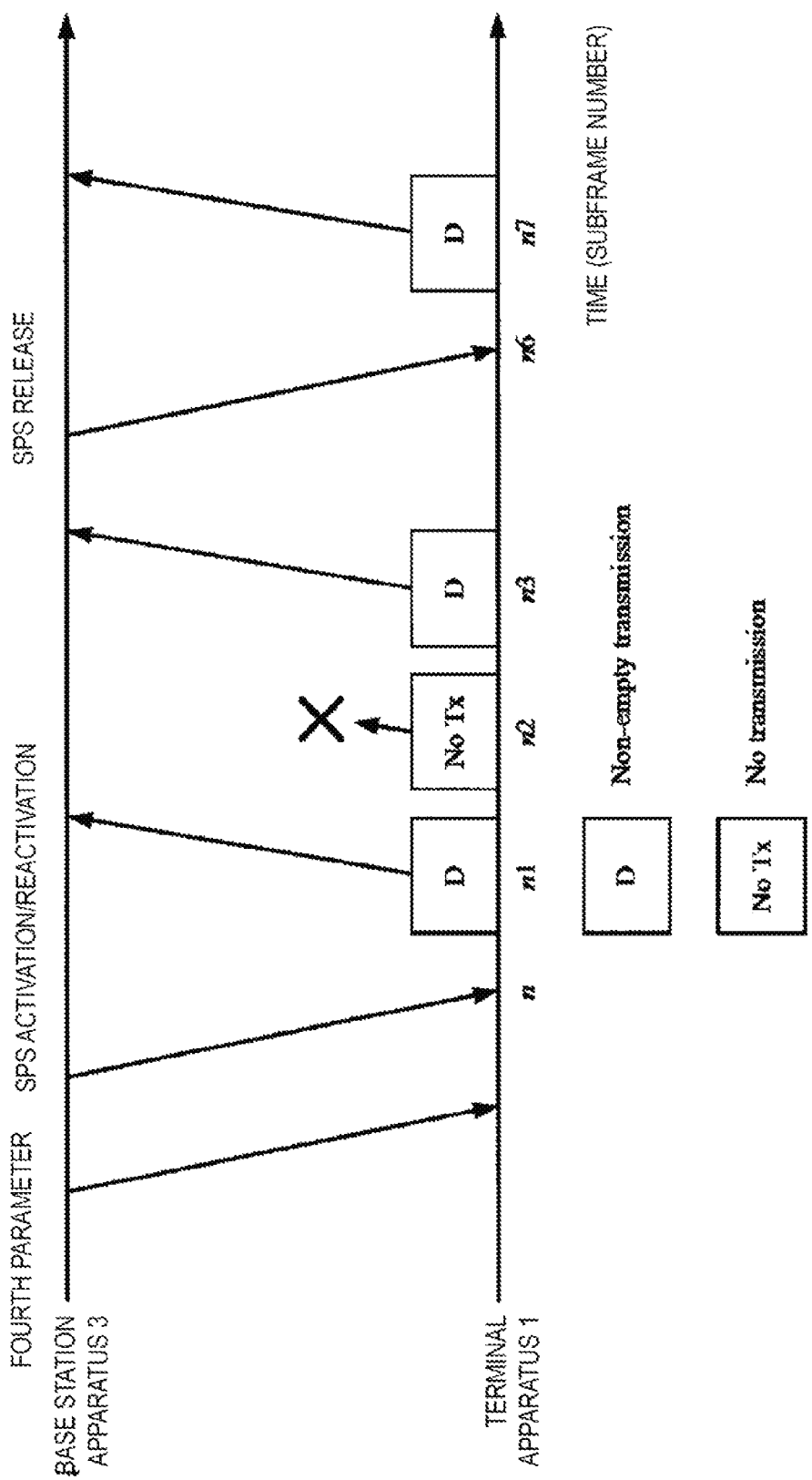
FIG. 9 is a diagram for describing an uplink data transmission method according to the present embodiment.

FIG. 9 is a diagram for describing an uplink data transmission method according to the present embodiment. The uplink data transmission method described with reference to FIG. 9 may be applied to the base station apparatus 3 and/or terminal apparatus 1 described above. Hereinafter, a behavior described with reference to FIG. 9 is also referred to as a second behavior. FIG. 9 illustrates a behavior in the case that the interval value of the Semi-Persistent Scheduling is configured to be "1 (1 subframe)". The transmissions illustrated in FIG. 9 represent transmissions on the Semi-Persistent Scheduling resource.

As illustrated in FIG. 9, the base station apparatus 3 may transmit the fourth parameter to the terminal apparatus 1. For example, the base station apparatus 3 may transmit the fourth parameter by using higher layer signaling (e.g., RRC layer signaling). For example, the fourth parameter may include a parameter used to configure to perform the second behavior (which may be a partial behavior included in the second behavior). The fourth parameter may include a parameter used to configure the interval value of the uplink Semi-Persistent Scheduling "1 (1 subframe)".

The fourth parameter may include a parameter used to configure whether the empty transmission is performed on the Semi-Persistent Scheduling resource (configure to perform or not to perform the transmission).

To be more specific, the terminal apparatus 1 may switch between the first behavior and the second behavior, based on the fourth parameter transmitted by the base station apparatus 3 (e.g., a parameter in the higher layer or a parameter in the RRC layer). For example, the terminal apparatus 1 may perform the first behavior in a case of not being configured with the fourth parameter, and perform the second behavior in a case of being configured with the fourth parameter.

In a subframe n, the terminal apparatus 1 receives the DCI (the DCI format, the uplink grant) which is used to indicate the activation and/or reactivation of the Semi-Persistent Scheduling. Here, in a case that the terminal apparatus 1 has data available for transmission, the terminal apparatus 1 may perform the non-empty transmission in a subframe (e.g., a subframe that is four subframes after the subframe n, i.e., subframe n1) corresponding to the subframe in which the DCI used to indicate the activation and/or reactivation of the Semi-Persistent Scheduling is received.

In the subframe n1, the terminal apparatus 1 having available data for transmission may perform the non-empty transmission. For example, the terminal apparatus 1 having available data for transmission does not perform a transmission of only the padding BSR and/or padding in the subframe n1.

A subframe n2 represents a subframe in which the terminal apparatus 1 does not have available data for transmission. Here, in the subframe n2, the terminal apparatus 1 not having available data for transmission does not perform the empty transmission.

In other words, the terminal apparatus 1 configured with the fourth parameter does not perform the empty transmission in a case of not having available data for transmission. As described above, the terminal apparatus 1 not configured with the fourth parameter performs the empty transmission in the case of not having available data for transmission. To be more specific, the terminal apparatus 1 may switch between whether to perform the empty transmission, based on the fourth parameter, in the case of not having available data for transmission.

Here, in the subframe n2, the terminal apparatus 1 may always perform the non-empty transmission or the empty transmission in a case of transmission corresponding to the DCI (the DCI format, the uplink grant) to which the CRC parity bits scrambled with the C-RNTI are attached. In other words, in a case that a PUSCH resource is scheduled by using the DCI to which the CRC parity bits scrambled with the C-RNTI are attached, the terminal apparatus 1 may always perform the non-empty transmission or the empty transmission on the scheduled PUSCH resource.

To be more specific, a resource scheduled by using the DCI to which the CRC parity bits scrambled with the C-RNTI are attached (dynamically scheduled resource) may override a resource scheduled by using the DCI to which the CRC parity bits scrambled with the SPS C-RNTI are attached (semi-permanently scheduled resource).

Here, the scheduled PUSCH resource may be a resource of a serving cell including the Semi-Persistent Scheduling resource. The scheduled PUSCH resource may be a resource of a serving cell other than the serving cell including the Semi-Persistent Scheduling resource. Specifically, the scheduled PUSCH resource may be a resource of a serving cell including the Semi-Persistent Scheduling resource, or a resource of a serving cell other than the serving cell including the Semi-persistent scheduling resource.

Specifically, the terminal apparatus 1 which is configured with the fourth parameter, has the available data for transmission, and is given the uplink grant corresponding to the Semi-Persistent Scheduling may perform the non-empty transmission.

The terminal apparatus 1 which is configured with the fourth parameter, does not have the available data for transmission, and is given the uplink grant corresponding to the Semi-Persistent Scheduling does not perform the empty transmission.

The terminal apparatus 1 which has the available data for transmission and is given the uplink grant corresponding to the dynamic scheduling may perform the non-empty transmission regardless of being configured with the fourth parameter.

The terminal apparatus 1 which does not have the available data for transmission and is given the uplink grant corresponding to the dynamic scheduling may perform the empty transmission regardless of being configured with the fourth parameter.

A subframe n3 represents a subframe in which the terminal apparatus 1 has available data for transmission. In the subframe n3, the terminal apparatus 1 having available data for transmission may perform the non-empty transmission.

In a subframe n6, the terminal apparatus 1 receives the DCI (the DCI format, the uplink grant) which is used to indicate the release of the Semi-Persistent Scheduling. Here, in the case that the terminal apparatus 1 has data available for transmission, the terminal apparatus 1 may perform the non-empty transmission in a subframe (e.g., a subframe that is four subframes after the subframe n6, i.e., subframe n7) corresponding to the subframe in which the DCI used to indicate release of the Semi-Persistent Scheduling is received.

Here, the terminal apparatus 1 may perform the non-empty transmission on the PUSCH (PUSCH resource) scheduled using the most recent DCI to be used to indicate activation and/or deactivation of the Semi-Persistent Scheduling, for receiving the DCI to be used to indicate release of the Semi-Persistent Scheduling and having data available for transmission. In other words, in the case that the terminal apparatus 1 has data available for transmission, the terminal apparatus 1 may perform the non-empty transmission on the PUSCH (PUSCH resource) scheduled by using the configured grant which is stored.

As described above, the field associated with the resource block assignment (resource allocation) in the DCI which is used to indicate that the release of the Semi-Persistent Scheduling may be set to a value defined in advance for the release of the Semi-Persistent Scheduling. Hence, the terminal apparatus 1 may perform the non-empty transmission, based on the configured grant in the case of receiving the DCI to be used to indicate release of the Semi-Persistent Scheduling.

In other words, the terminal apparatus 1 may perform the non-empty transmission, based on the configured grant in the case of receiving the DCI which is used to indicate the release of the Semi-Persistent Scheduling. To be more specific, the terminal apparatus 1 may perform the non-empty transmission on the PUSCH (PUSCH resource) before the release of the PUSCH (PUSCH resource) in the case of receiving the DCI which is used to indicate the release of the Semi-Persistent Scheduling. Here, the PUSCH (PUSCH resource) is scheduled using the most recent DCI which is used to indicate the activation and/or deactivation of the Semi-Persistent Scheduling. Specifically, the PUSCH (PUSCH resource) is scheduled by using the configured grant. Here, the most recent DCI is also referred to as the last received DCI.

To be more specific, in the subframe n7, the terminal apparatus 1 having available data for transmission may perform the non-empty transmission based on the configured grant. In other words, for example, in the subframe n7, the terminal apparatus 1 having available data for transmission does not perform the transmission of only the padding BSR and/or padding.

The terminal apparatus 1 may clear the configured grant and/or release the uplink resource in a subframe where the non-empty transmission has been performed or in a subframe after the subframe. Specifically, the terminal apparatus 1 configured with the fourth parameter may perform the non-empty transmission or empty transmission in the case of receiving the DCI which is used to indicate release of the Semi-Persistent Scheduling, and may clear the configured grant and/or release the uplink resource in a subframe in which the non-empty transmission or empty transmission is performed or in subframes after the subframe.

The terminal apparatus 1 may clear the configured grant and/or release the uplink resource in the subframe in which the DCI used to indicate the release of the Semi-Persistent Scheduling is received or in subframes after the subframe. Specifically, in the case of receiving the DCI to be used to indicate release of the Semi-Persistent Scheduling, the terminal apparatus 1 configured with the fourth parameter may deliver the configured grant to the HARQ entity, and thereafter, may clear the configured grant and/or release the uplink resource in the subframe where the DCI used to indicate the release of the Semi-Persistent Scheduling is received or in a subframe after the subframe.

As describe above, the terminal apparatus 1 not configured with the fourth parameter clears the configured grant and/or releases the uplink resource without transmitting any information to the base station 3 in the case of receiving the DCI which is used to indicate the release of the Semi-Persistent Scheduling. In other words, in the case of receiving the DCI to be used to indicate release of the Semi-Persistent Scheduling, based on the fourth parameter, the terminal apparatus 1 may perform the non-empty transmission and thereafter may switch between whether to clear the configured grant and/or release the uplink resource, or to clear the configured grant and/or release the uplink resource without transmitting any information to the base station 3.

As described above, the terminal apparatus 1 not having available data for transmission does not perform the empty transmission. In a case that only the second MAC control element is available for transmission, the terminal apparatus 1 does not perform the empty transmission. In a case that only the second MAC control element and/or padding is available for transmission, the terminal apparatus 1 does not perform the empty transmission.

To be more specific, not performing the empty transmission may be defined as the behavior (processing) in the HARQ entity in the terminal apparatus 1. In other words, performing the non-empty transmission, not performing the non-empty transmission, performing the empty transmission, and/or not performing the empty transmission may be defined as the behavior (processing) in the HARQ entity.

For example, it may be defined that whether the HARQ entity acquires the MAC protocol data unit to transmit (the MAC PDU to transmit) from the first entity is determined based on whether the HARQ entity has data available for transmission. The HARQ entity may acquire the MAC protocol data unit to transmit (the MAC PDU to transmit) from the first entity, in the case that the HARQ entity has data available for transmission. For example, it may be defined that, in a case that the fourth parameter is configured, the uplink grant is addressed to the SPS C-RNTI, and the HARQ entity has data available for transmission, the HARQ entity acquires the MAC protocol data unit from the first entity. Here, the MAC protocol data unit may include one or multiple first MAC control elements and/or one or multiple MAC service data units.

In a case that the MAC protocol data unit is acquired, the HARQ entity delivers the MAC protocol data unit and the configured grant to the HARQ process and instructs the HARQ process to trigger an initial transmission. The HARQ process may store the configured grant and instruct a physical layer to generate the transmission according to the stored uplink grant.

In a case of not having data available for transmission, the HARQ entity may not necessarily acquire the MAC protocol data unit to transmit (the MAC PDU to transmit) from the first entity. For example, in a case that the fourth parameter is configured, the uplink grant is addressed to the SPS C-RNTI, and the HARQ entity does not have data available for transmission, it may be defined that the HARQ entity does not acquire the MAC protocol data unit from the first entity. In a case that the MAC protocol data unit is not acquired, the HARQ entity does not deliver the MAC protocol data unit and the configured grant to the HARQ process and does not instruct the HARQ process to trigger an initial transmission.

The first entity may provide the MAC protocol data unit to transmit. A Logical Channel Prioritization procedure in a case that a new transmission is performed may be applied to the first entity. The first entity may multiplex the MAC control element and the MAC service data unit.

For example, in a case that the empty transmission is not performed, the first entity may not necessarily generate a MAC protocol data unit corresponding to the empty transmission. In the case that the empty transmission is not performed, the first entity may not deliver a MAC protocol data unit corresponding to the empty transmission to the HARQ entity.

In the case that the empty transmission is not performed, the HARQ entity may not necessarily deliver a MAC protocol data unit corresponding to the empty transmission to the HARQ process. In the case that the empty transmission is not performed, the HARQ process may not deliver a MAC protocol data unit corresponding to the empty transmission to the physical layer.

It may be also defined that in the case that the MAC entity is configured with the fourth parameter, has available data for transmission, and is given the uplink grant corresponding to the Semi-Persistent Scheduling, the MAC entity transmits the MAC protocol data unit including one or multiple first MAC control elements.

That is, it may be defined that in the case that the MAC entity is configured with the fourth parameter, has available data for transmission, and is given the uplink grant corresponding to the Semi-Persistent Scheduling, the MAC entity transmits the MAC protocol data unit including one or multiple MAC service data units and/or one or multiple first MAC control elements.

It may be defined that in the case that the MAC entity is configured with the fourth parameter, has available data for transmission, and is given the uplink grant corresponding to the Semi-Persistent Scheduling, the MAC entity does not transmit the MAC protocol data unit including only padding.

It may be defined that in the case that the MAC entity is configured with the fourth parameter, has available data for transmission, and is given the uplink grant corresponding to the Semi-Persistent Scheduling, the MAC entity does not transmit the MAC protocol data unit including one or multiple second MAC control elements.

It may be defined that in the case that the MAC entity is configured with the fourth parameter, has available data for transmission, and is given the uplink grant corresponding to the Semi-Persistent Scheduling, the MAC entity does not transmit the MAC protocol data unit including only padding and/or one or multiple second MAC control elements.

For example, it may be defined that in a case that the MAC entity is configured with the fourth parameter, has available data for transmission, and is given with the uplink grant corresponding to the Semi-Persistent Scheduling, the MAC entity transmits the MAC protocol data unit including one or multiple MAC service data units.

It may be also defined that in the case that the MAC entity is configured with the fourth parameter, has available data for transmission, and is given the uplink grant corresponding to the Semi-Persistent Scheduling, the MAC entity transmits the MAC protocol data unit including one or multiple first MAC control elements.

That is, it may be defined that in the case that the MAC entity is configured with the fourth parameter, has available data for transmission, and is given the uplink grant corresponding to the Semi-Persistent Scheduling, the MAC entity transmits the MAC protocol data unit including one or multiple MAC service data units and/or one or multiple first MAC control elements.

It may be defined that in the case that the MAC entity is configured with the fourth parameter, has available data for transmission, and is given the uplink grant corresponding to the Semi-Persistent Scheduling, the MAC entity does not transmit the MAC protocol data unit including only padding.

It may be defined that in the case that the MAC entity is configured with the fourth parameter, has available data for transmission, and is given the uplink grant corresponding to the Semi-Persistent Scheduling, the MAC entity does not transmit the MAC protocol data unit including one or multiple second MAC control elements.

It may be defined that in the case that the MAC entity is configured with the fourth parameter, has available data for transmission, and is given the uplink grant corresponding to the Semi-Persistent Scheduling, the MAC entity does not transmit the MAC protocol data unit including only padding and/or one or multiple second MAC control elements.

The NDI included in the DCI format (uplink grant) will be described below.

The base station apparatus 3 may indicate the terminal apparatus 1 to perform an initial transmission or an adaptive retransmission, by using the NDI included in the uplink grant to transmit.

The HARQ entity and the HARQ process store the value of the NDI included in the uplink grant addressed to the C-RNTI.

In a case that the received uplink grant is addressed to the C-RNTI and the NDI included in the received uplink grant is toggled compared to the value of NDI in the previous transmission of the HARQ process corresponding to the received uplink grant, the HARQ entity acquires the MAC protocol data unit from the first entity, delivers the MAC protocol data unit and the received uplink grant to the HARQ process, and instructs the HARQ process to trigger the initial transmission.

In a case that the received uplink grant is addressed to the C-RNTI and the NDI included in the received uplink grant is not toggled compared to the value of NDI in the previous transmission of the HARQ process corresponding to the received uplink grant, the HARQ entity delivers the received uplink grant to the HARQ process and instructs the HARQ process to generate an adaptive retransmission.

In a case of receiving the DCI (uplink grant) to be used to indicate activation and/or reactivation of the Semi-Persistent Scheduling on the PDCCH, the MAC entity and the HARQ entity may consider that the NDI for the HARQ process is toggled. In other words, in a case of receiving the DCI (uplink grant) to be used to indicate activation and/or reactivation of the Semi-Persistent Scheduling, on the PDCCH, the MAC entity may consider that the NDI for the HARQ process is toggled and deliver the grant configured for the HARQ entity.

In a case that the N-th grant (configured uplink grant or SPS uplink grant) is considered to be generated in a subframe specified based on Equation (1), the MAC entity may consider that the NDI for the HARQ process is toggled and deliver the grant configured for the HARQ entity.

Figure 10:
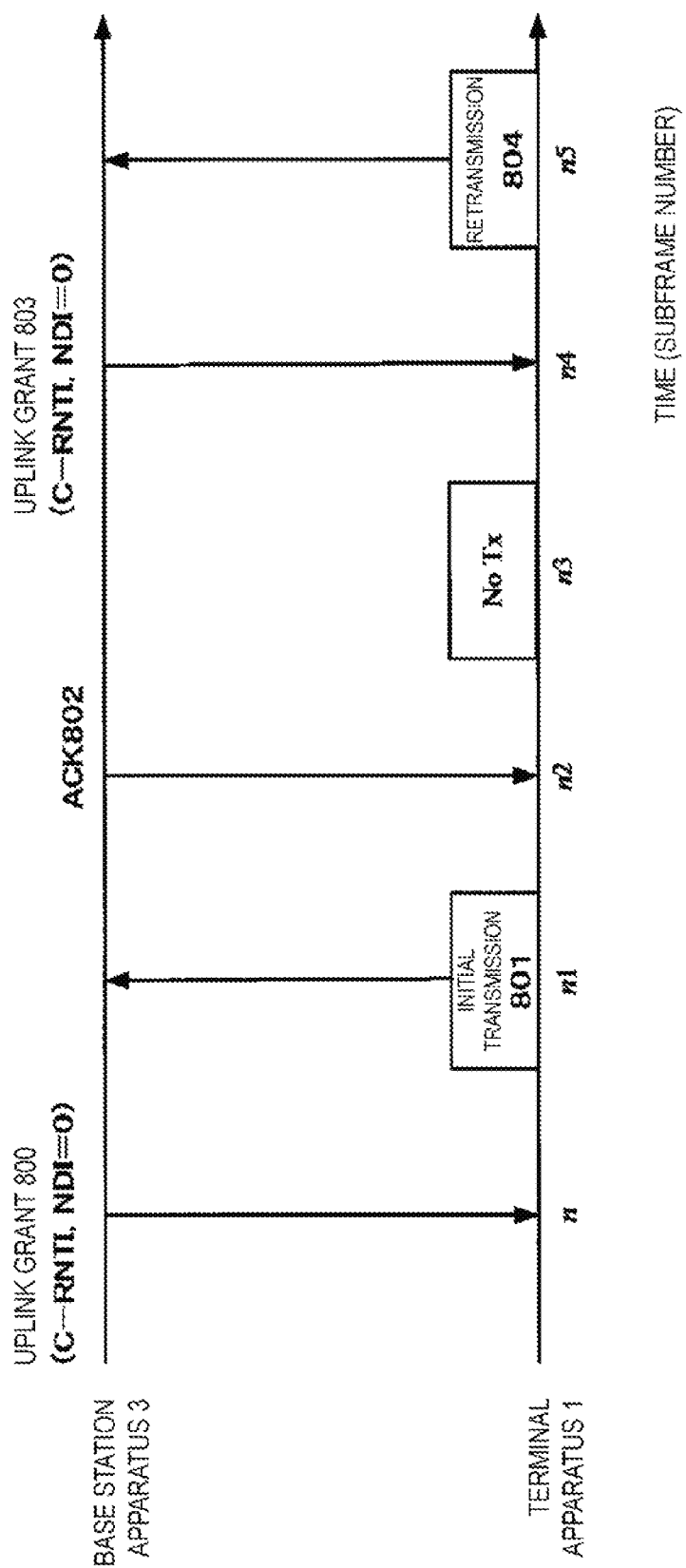
FIG. 10 is a diagram illustrating a first example for describing a NDI according to the present embodiment.
Figure 11:
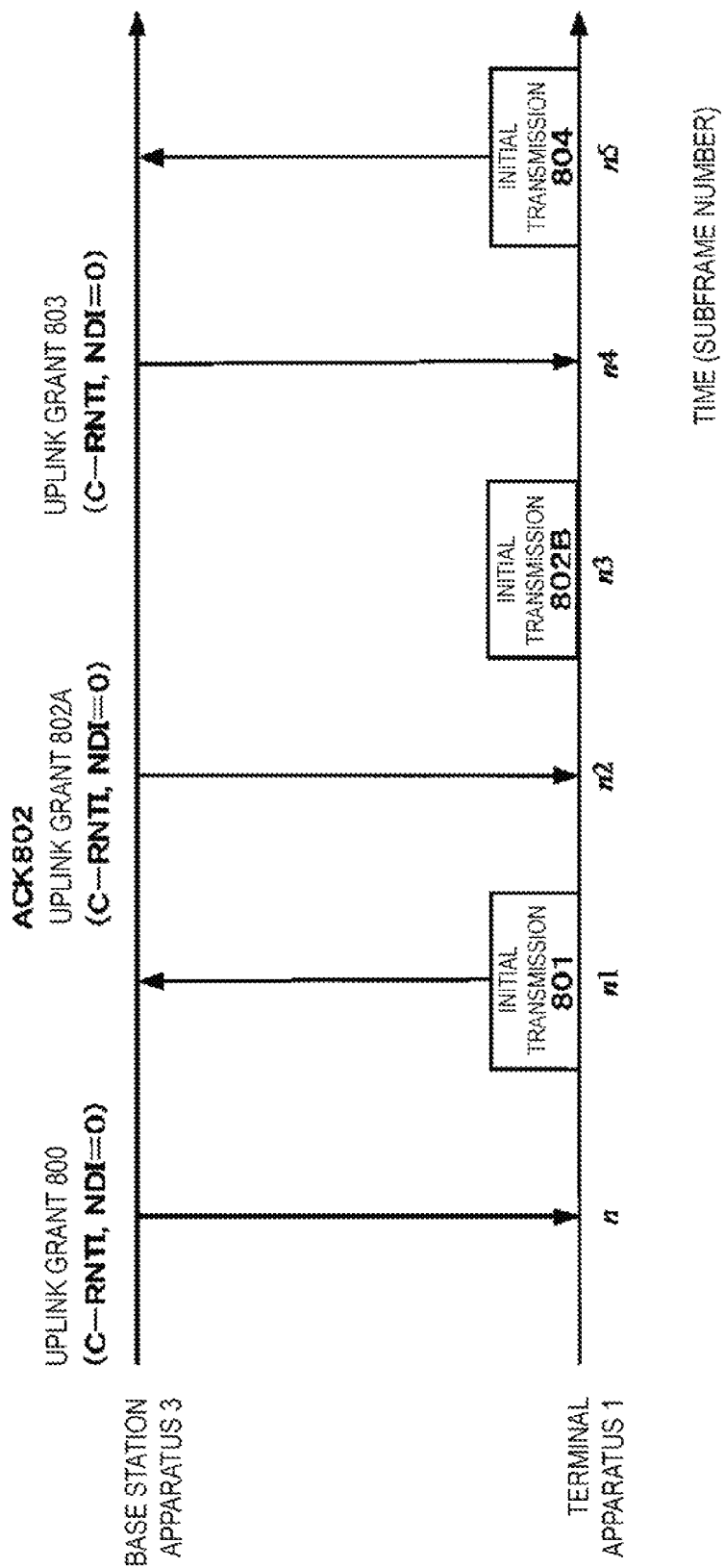
FIG. 11 is a diagram illustrating a second example for describing the NDI according to the present embodiment.

FIG. 10 is a diagram illustrating a first example for describing the NDI according to the present embodiment.
FIG. 11 is a diagram illustrating a second example for describing the NDI according to the present embodiment.
FIG. 12 is a diagram illustrating a third example for describing the NDI according to the present embodiment.

In the subframe n in FIG. 10 to FIG. 12, the terminal apparatus 1 receives an uplink grant 800 for an HARQ process A. The uplink grant 800 is addressed to the C-RNTI. The NDI field value included in the uplink grant 800 is 0. The MAC entity delivers the uplink grant 800 to the HARQ entity. The HARQ entity stores the NDI field value (0) included in the uplink grant 800. The HARQ entity acquires the MAC protocol data unit from the first entity, delivers the MAC protocol data unit and the uplink grant 800 to the HARQ process A, and instructs the HARQ process A to trigger an initial transmission. The HARQ process A (i) stores the MAC protocol data unit and the uplink grant 800 and (ii) instructs the physical layer to generate a transmission 801 of the MAC protocol data unit according to the stored uplink grant 800. In the subframe n1 in FIG. 10 to FIG. 12, the physical layer performs the initial transmission 801 of the MAC protocol data according to the stored uplink grant 800. The HARQ process A is also referred to as a first HARQ process.

In the subframe n2 in FIG. 10, the terminal apparatus 1 receives ACK for the HARQ process A (MAC protocol data unit). The HARQ entity delivers the ACK to the HARQ process A. The HARQ process A sets the ACK to a state variable. Here, the HARQ process A holds the stored MAC protocol data unit. Here, the HARQ process A does not instruct the physical layer to generate any transmission of the MAC protocol data unit according to the stored uplink grant 800. In other words, in the subframe n3 in FIG. 10, the MAC protocol data unit is not transmitted.

In the subframe n4 in FIG. 10, the terminal apparatus 1 receives an uplink grant 803 for the HARQ process A. The uplink grant 803 is addressed to the C-RNTI. The NDI field value included in the uplink grant 803 is 0. The MAC entity delivers the uplink grant 803 to the HARQ entity. The HARQ entity delivers the uplink grant 803 to the HARQ process A and instructs the HARQ process A to generate an adaptive retransmission, based on that the value (0) of the NDI included in the uplink grant 803 is not toggled compared to the stored value (0) of the NDI. The HARQ process A (i) stores the uplink grant 803 and (ii) instructs the physical layer to generate a retransmission 804 of the MAC protocol data unit according to the stored uplink grant 803. In the subframe n5 in FIG. 10, the physical layer performs the adaptive retransmission 804 of the MAC protocol data unit according to the stored uplink grant 803.

As described above, the base station apparatus 3 can put retransmission of the MAC protocol data unit on hold by transmitting only ACK in the subframe n3 in FIG. 10. In addition, the base station apparatus 3 can cause the terminal apparatus 1 to resume the retransmission of the MAC protocol data unit by transmitting the uplink grant 803 including the NDI having the same value as the value of the NDI included in the uplink grant 800 in the subframe n4.

In the subframe n2 in FIG. 11, the terminal apparatus 1 receives ACK for the HARQ process A and an uplink grant 802A for the HARQ process A. The uplink grant 802A is addressed to the SPS C-RNTI. The NDI field value included in the uplink grant 802A is 0. The uplink grant 802A is used for activation of the Semi-Persistent Scheduling. The MAC entity stores the uplink grant 802A, considers that the NDI for the HARQ process A is toggled, and delivers the stored uplink grant 802A to the HARQ entity. The HARQ process A sets ACK to a state variable.

In a case that the fourth parameter is configured, the uplink grant 802A is addressed to the SPS C-RNTI, and the HARQ entity has data available for transmission, the HARQ entity acquires the MAC protocol data unit from the first entity, delivers the MAC protocol data unit and the uplink grant 802A to the HARQ process A, and instructs the HARQ process A to trigger an initial transmission. The HARQ process A (i) stores the MAC protocol data unit and the uplink grant 802A and (ii) instructs the physical layer to generate the transmission 801 of the MAC protocol data unit according to the stored uplink grant 802A. In the subframe n3 in FIG. 11, the physical layer performs an initial transmission 802B of the MAC protocol data according to the stored uplink grant 802A.

In the subframe n4 in FIG. 11, the terminal apparatus 1 receives the uplink grant 803 for the HARQ process A. The uplink grant 803 is addressed to the C-RNTI. The NDI field value included in the uplink grant 803 is 0. The MAC entity delivers the uplink grant 803 to the HARQ entity. Based on that (i) the uplink grant 803 corresponds to the C-RNTI and (ii) the immediately previous uplink grant 802A delivered to the HARQ process A is an uplink grant received for the SPS C-RNTI, the MAC entity considers that the NDI for the HARQ process A is toggled regardless of the value of the NDI included in the uplink grant 803. Based on the consideration that the NDI for the HARQ process A is toggled regardless of the value of the NDI included in the uplink grant 803, the HARQ entity acquires the MAC protocol data unit from the first entity, delivers the MAC protocol data unit and the uplink grant 803 to the HARQ process A, and instructs the HARQ process A to trigger the initial transmission. The HARQ process A (i) stores the MAC protocol data unit and the uplink grant 803 and (ii) instructs the physical layer to generate a transmission 804 of the MAC protocol data unit according to the stored uplink grant 803. In the subframe n5 in FIG. 11, the physical layer performs the initial transmission 804 of the MAC protocol data according to the stored uplink grant 803.

In the subframe n2 in FIG. 12, the terminal apparatus 1 receives ACK for the HARQ process A and the uplink grant 802A for the HARQ process A. The uplink grant 802A is addressed to the SPS C-RNTI. The value of the NDI field included in the uplink grant 802A is 0. The uplink grant 802A is used for activation of the Semi-Persistent Scheduling. The MAC entity stores the uplink grant 802A, considers that the NDI for the HARQ process A is toggled, and delivers the stored uplink grant 802A to the HARQ entity. The HARQ process A sets ACK for a state variable.

In a case that the fourth parameter is configured, the uplink grant 802A is addressed to the SPS C-RNTI, and the HARQ entity does not have data available for transmission, the HARQ entity does not acquire the MAC protocol data unit from the first entity, does not deliver the MAC protocol data unit and the uplink grant 802A to the HARQ process A, and does not instructs the HARQ process A to trigger the initial transmission. The HARQ process A (i) holds the MAC protocol data unit and (ii) does not instruct the physical layer to generate a transmission 802B of the MAC protocol data unit according to the stored uplink grant 800. In the subframe n3 in FIG. 12, the physical layer does not perform the transmission 802B of the MAC protocol data according to the stored uplink grant 800.

In the subframe n4 in FIG. 12, the terminal apparatus 1 receives the uplink grant 803 for the HARQ process A. The uplink grant 803 is addressed to the C-RNTI. The value of the NDI field included in the uplink grant 803 is 0. The MAC entity delivers the uplink grant 803 to the HARQ entity.

In the subframe n4 in FIG. 12, the immediately previous uplink grant delivered to the HARQ process A is the uplink grant 800. Based on that (i) the uplink grant 803 corresponds to the C-RNTI and (ii) the immediately previous uplink grant 800 delivered to the HARQ process A is not an uplink grant received for the SPS C-RNTI, the MAC entity does not consider that the NDI for the HARQ process A is toggled regardless of the value of the NDI included in the uplink grant 803. Based on that the value (0) of the NDI included in the uplink grant 803 is not toggled compared to the stored value (0) of the NDI, the HARQ entity delivers the uplink grant 803 to the HARQ process A and instructs the HARQ process A to generate an adaptive retransmission.

The HARQ process A (i) stores the uplink grant 803 and (ii) instructs the physical layer to generate a retransmission 804 of the MAC protocol data unit according to the stored uplink grant 803. In the subframe n5 in FIG. 12, the physical layer performs the adaptive retransmission 804 of the MAC protocol data unit according to the stored uplink grant 803.

In a case that the immediately previous uplink grant delivered from the HARQ entity to the HARQ process A is not an uplink grant received for the SPS C-RNTI, the MAC entity and the HARQ entity may not necessarily consider that the NDI for the HARQ process A is toggled regardless of the value of the NDI included in the uplink grant 803.

In a case that the immediately previous uplink grant delivered from the HARQ entity to the HARQ process A is an uplink grant received for the SPS C-RNTI, the MAC entity and the HARQ entity may consider that the NDI for the HARQ process A is toggled regardless of the value of the NDI included in the uplink grant 803.

In a case that the fourth parameter is not configured, the HARQ entity may deliver the uplink grant 802A to the HARQ process A regardless of whether the HARQ entity has data available for transmission. In a case that the fourth parameter is configured and the uplink grant 802A is addressed to the C-RNTI, the HARQ entity may deliver the uplink grant 802A to the HARQ process A regardless of whether the HARQ entity has data available for transmission.

In a case that the fourth parameter is configured and the uplink grant 802A is addressed to the SPS C-RNTI, the HARQ entity may determine whether the uplink grant 802A is delivered from the HARQ entity to the HARQ process A, based on whether the HARQ entity has data available for transmission.

In a case that the fourth parameter is configured, the uplink grant 802A is addressed to the SPS C-RNTI, and the HARQ entity has data available for transmission, the HARQ entity may deliver the uplink grant 802A to the HARQ process A.

In a case that the fourth parameter is configured, the uplink grant 802A is addressed to the SPS C-RNTI, and the HARQ entity does not have data available for transmission, the HARQ entity may not necessarily deliver the uplink grant 802A to the HARQ process A.

Regardless of whether the fourth parameter is configured, whether the uplink grant 802A is addressed to the SPS C-RNTI, and whether the MAC entity has data available for transmission, the MAC entity delivers the uplink grant 802A for the HARQ process A to the HARQ entity.

In a case that the immediately previous uplink grant for the HARQ process A delivered from the MAC entity to the HARQ entity is an uplink grant received for the SPS C-RNTI, the MAC entity and the HARQ entity may consider that the NDI for the HARQ process A is toggled regardless of whether the immediately previous uplink grant has been delivered from the HARQ entity to the HARQ process A and the value of the NDI included in the uplink grant 803.

In FIG. 12, in a case that the immediately previous uplink grant for the HARQ process A delivered from the MAC entity to the HARQ entity is an uplink grant received for the SPS C-RNTI, and the immediately previous uplink grant is not delivered from the HARQ entity to the HARQ process A, the MAC entity and the HARQ entity may acquire the MAC protocol data unit from the first entity, deliver the MAC protocol data unit and the uplink grant 803 to the HARQ process A, and instructs the HARQ process A to trigger an initial transmission, even in a case that the MAC protocol data unit corresponding to the HARQ process A is stored and the value of the NDI included in the uplink grant 803 addressed to the C-RNTI is not toggled compared to the value of the NDI in the previous transmission of the HARQ process A.

In the present embodiment, the "uplink grant 802A" in FIG. 11 and FIG. 12 may be replaced with the "configured grant" or the "uplink grant 802A or configured grant".

Figure 13:
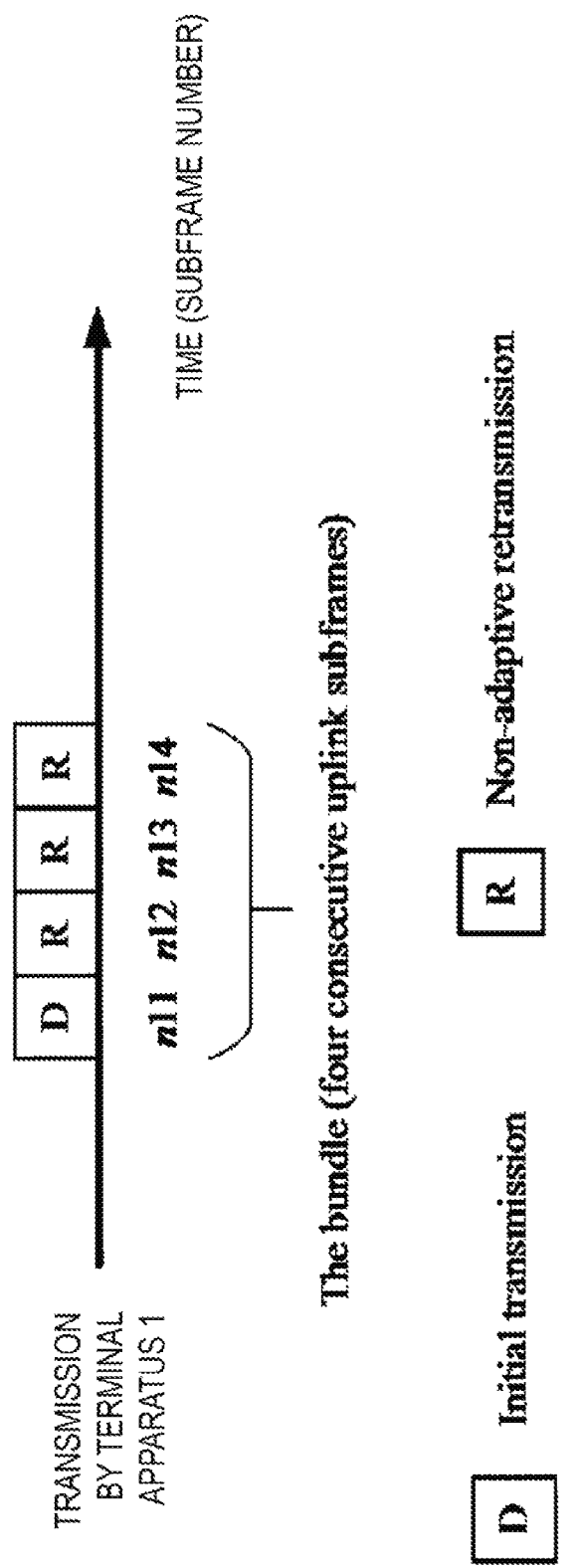
FIG. 13 is a diagram for describing the uplink data transmission method according to the present embodiment.

FIG. 13 is a diagram for describing the uplink data transmission method according to the present embodiment. The uplink data transmission method described with reference to FIG. 13 may be applied to the base station apparatus 3 and/or terminal apparatus 1 described above.

FIG. 13 illustrates a behavior in a case that a subframe bundling operation is configured for the terminal apparatus 1 performing the second behavior. Here, the base station apparatus 3 may use a parameter for the higher layer (also referred to as ttiBundling) to configure the subframe bundling operation. For example, in a case that the parameter for the higher layer is used to configure usage of the subframe bundling, the subframe bundling operation may be applied to the PUSCH (UL-SCH). For example, in a case that the parameter for the higher layer is used to configure usage of the subframe bundling, the subframe bundling operation may be applied to the PDSCH (DL-SCH). For example, in a case that the parameter for the higher layer is used to configure usage of the subframe bundling, the subframe bundling operation may be applied to both the PDSCH (DL-SCH) and the PUSCH (UL-SCH).

Although a detailed description will be given of the subframe bundling operation for the PUSCH below, the present embodiment may be applied to the PDSCH.

In a case that usage of the subframe bundling is configured, four consecutive uplink subframes may be used for the transmission on the UL-SCH (uplink data transmission). Here, four consecutive uplink subframes may be referred to as a bundle. Note that the number of consecutive uplink subframes included in a single bundle may be given based on information received from the base station apparatus 3.

The transmissions in the four respective consecutive uplink subframes correspond to the same HARQ process and the same transport block (MAC protocol data unit). As illustrated in FIG. 13, for example, the terminal apparatus 1 configured with the subframe bundling operation may perform the initial PUSCH transmission in the subframe n11. The terminal apparatus 1 may perform a non-adaptive PUSCH retransmission in the subframe n12, the subframe n13, and the subframe n14. The non-adaptive PUSCH retransmission in the subframe n12, the subframe n13, and the subframe n14 in a single bundle is triggered without waiting for feedback for the previous transmission (uplink grant and HARQ feedback). Here, the subframe n11, the subframe n12, the subframe n13, and the subframe n14 represent the four consecutive uplink subframes.

A description will be given of a redundancy version $rv_{idx}$ $\in \{0, 1, 2, 3\}$ according to the present embodiment below.

The redundancy version for the PUSCH is given based on information of Modulation and coding scheme (MCS) and/or redundancy version included in the uplink grant. The redundancy version for the PDSCH is given based on information of redundancy version (Modulation and coding scheme and/or redundancy version) included in the downlink assignment.

The redundancy version is used for coding of a transport block (codeword). The transport block is mapped to a codeword. The codeword is a unit of coding.

A description will be given of coding of a transport block (codeword) below.

Figure 14:
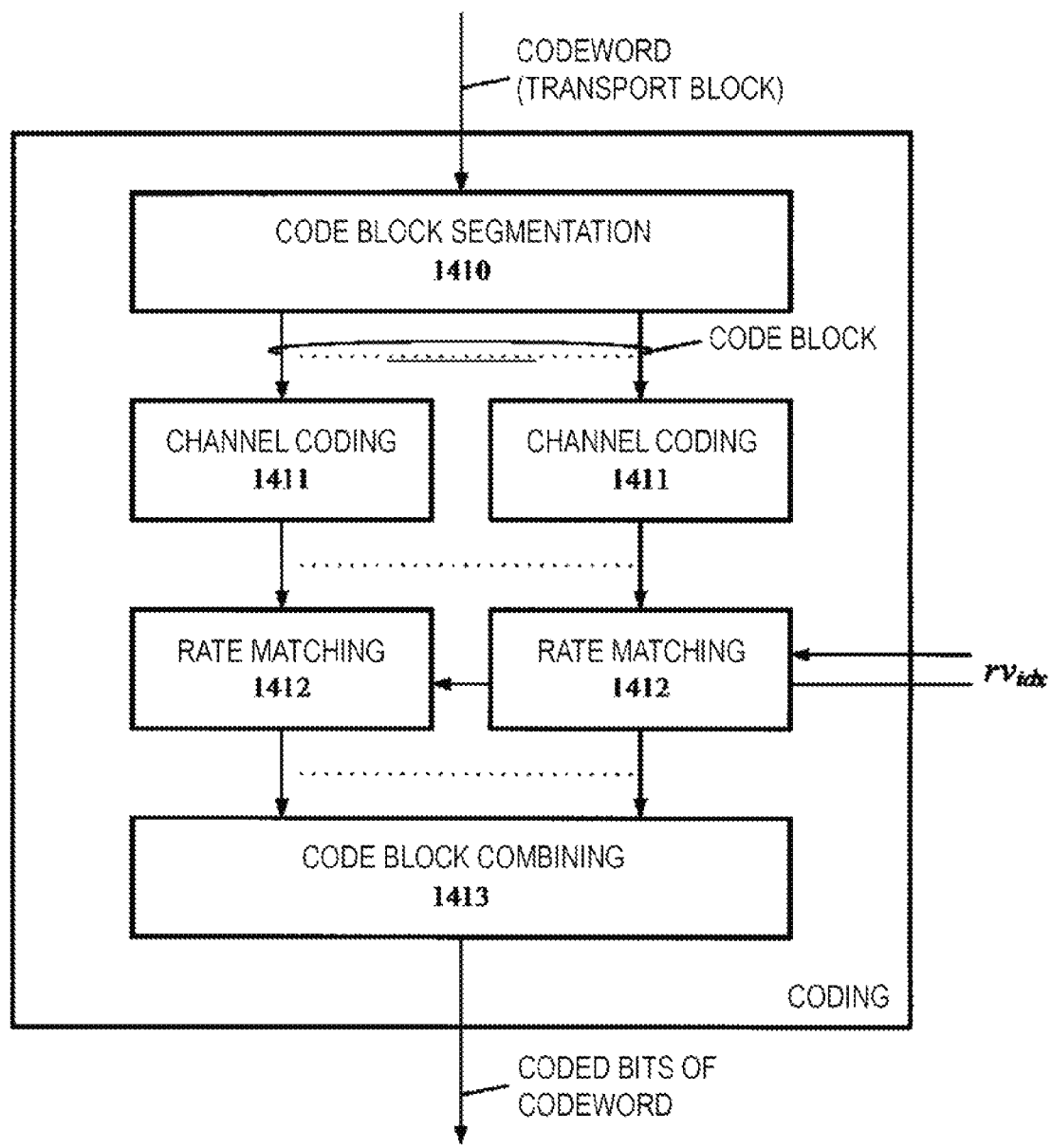
FIG. 14 is a diagram illustrating an example of a codeword (transport block) coding process according to the present embodiment.

FIG. 14 is a diagram illustrating an example of a codeword (transport block) coding processing according to the present embodiment. The processing in FIG. 14 may be applied to each transport block. The processing in FIG. 14 may be applied to each of the transmissions in a single bundle. A single transport block is mapped to a single codeword. In other words, coding a transport block is the same as coding a codeword.

(Step 1410) After attaching corresponding CRC parity bits to a single codeword, the codeword is divided into one or multiple code blocks. Corresponding CRC parity bits may be attached to each of the code blocks. (Step 1411) Each of one or multiple code blocks is coded (e.g., turbo coding, convolutional coding, or Low Density Parity Check (LDPC) coding is applied).

(Step 1412) Rate matching is applied to each of coded bit sequences of each code block. The rate matching is performed according to the redundancy version $rv_{idx}$.

(Step 1413) By combining the one or multiple code blocks to which the rate matching is applied, a coded bit sequence of the codeword is obtained.

Figure 15:
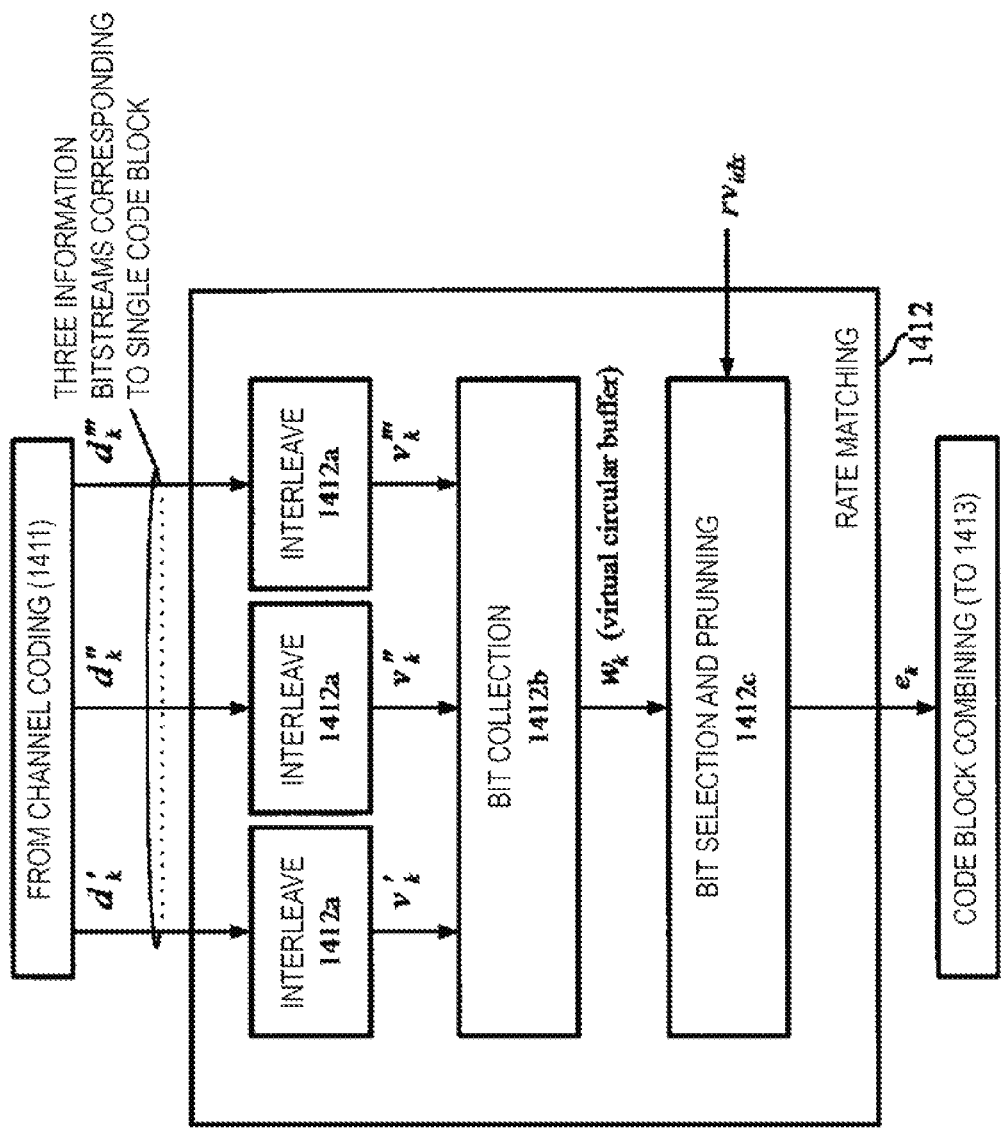
FIG. 15 is a diagram illustrating an example of rate matching according to the present embodiment.

FIG. 15 is a diagram illustrating an example of the rate matching according to the present embodiment. The rate matching is performed in Step 1412 in FIG. 14. In other words, the rate matching is applied to code blocks of a transport block.

One rate matching (Step 1412) includes three interleaves (Step 1412a), one bit collection (Step 1412b), and one bit selection and pruning (Step 1412c). To the one rate matching (Step 1412), three information bitstreams ($d'_k$, $d''_k$, $d'''_k$) are input from the channel coding (Step 1411). In Step 1412a, each of the three information bitstreams ($d'_k$, $d''_k$, $d'''_k$) is interleaved in accordance with a subblock interleaver. Through the interleaving of the three information bitstreams ($d'_k$, $d''_k$, $d'''_k$), three output sequences ($v'_k$, $v''_k$, $v'''_k$) are obtained.

The number $C_{subblock}$ of the columns of the subblock interleaver is 32. The number $R_{subblock}$ of the rows of the subblock interleaver is the smallest integer that satisfies Inequality (2) below. Here, D denotes the number of bits of each of the information bitstreams ($d'_k$, $d''_k$, $d'''_k$).

$$D \leq (R_{subblock} \times C_{subblock}) \quad \text{Inequality (2)}$$

The number Ku of bits of each of the output sequences ($v'_k$, $v''_k$, $v'''_k$) of the subblock interleaver is given according to Equation (3) below.

$$K_\Pi = (R_{subblock} \times C_{subblock}) \quad \text{Equation (3)}$$

In Step 1412b, $w_k$ (virtual circular buffer) is obtained from the three output sequences ($v'_k$, $v''_k$, $v'''_k$). $w_k$ is given according to Equations (4) below. The number $K_W$ of bits of $w_k$ is three time of $K_\Pi$.

$$w_k = v'_k \text{ for } k=0,\ldots,K_\Pi-1$$

$$w_{K_\Pi+2k} = v''_k \text{ for } k=0,\ldots,K_\Pi-1$$

$$w_{K_\Pi+2k+1} = v'''_k \text{ for } k=0,\ldots,K_\Pi-1 \quad \text{Equations (4)}$$

In Step 1412c (bit selection and pruning), a rate matching output bit sequence $e_k$ is obtained from $w_k$. The number of bits of the rate matching output bit sequence $e_k$ is E. FIG. 16 is a diagram illustrating an example of the bit selection and pruning according to the present embodiment. $rv_{idx}$ in FIG. 16 denotes a redundancy version (RV) number for transmission of a corresponding transport block. $N_{cb}$ in FIG. 16 denotes a soft buffer size for a corresponding code block and is expressed by the number of bits. $N_{cb}$ is given according to Equation (5) below.

$$N_{cb} = \begin{cases} \min\left(\left\lfloor \frac{N_{IR}}{C} \right\rfloor, K_w\right) & \text{for } PDSCH(DL\text{-}SCH) \\ K_w & \text{for } PUSCH(UL\text{-}SCH) \end{cases} \quad \text{Equation (5)}$$

Here, C denotes the number of code blocks into which a single transport block is divided in the code block segmentation (Step 1410) in FIG. 14. Here, $N_{IR}$ denotes a soft buffer size for a corresponding transport block and is expressed by the number of bits. $N_{IR}$ is given according to Equation (6) below.

$$N_{IR} = \left\lfloor \frac{N_{soft}}{K_C \cdot K_{MIMO} \cdot \min(M_{DL\_HARQ}, M_{limit})} \right\rfloor \quad \text{Equation (6)}$$

Here, $K_{MIMO}$ is 2 in a case that the terminal apparatus 1 is configured to receive PDSCH transmission, based on transmission mode 3, 4, 8, 9, or 10, and $K_{MIMO}$ is 1 in other cases. $K_{MIMO}$ is the same as the maximum number of transport blocks that can be included in a single PDSCH transmission received by the terminal apparatus 1 based on a configured transmission mode.

Here, $M_{DL\_HARQ}$ is the maximum number of downlink HARQ processes managed in parallel in a single corresponding serving cell. For a FDD serving cell, $M_{DL\_HARQ}$ may be 8. For a TDD serving cell, $M_{DL\_HARQ}$ may correspond to the uplink-downlink configuration. Here, $M_{limit}$ is 8.

Here, $K_c$ is any one of $\{1, 3/2, 2, 3, \text{and } 5\}$. A description of a method of configuring $K_c$ is omitted here.

Here, $N_{soft}$ denotes the total number of soft channel bits corresponding to a UE category or a downlink UE category. $N_{soft}$ is given by any one of capability parameter ue-Category (without suffix), capability parameter ue-Category-v1020, capability parameter ue-Category-v1170, and capability parameter ue-CategoryDL-r12.

In other words, the redundancy version $rv_{idx}$ is a parameter to be used for rate matching and is a parameter to be used for bit selection and pruning.

The redundancy version $rv_{idx}$ for a first PUSCH transmission in a bundle is given based on information of Modulation and coding scheme (MCS) and/or redundancy version included in the uplink grant.

The redundancy version $rv_{idx}$ for the initial PDSCH transmission in a bundle is given based on information of redundancy version (Modulation and coding scheme and/or redundancy version) included in the downlink assignment.

The redundancy version $rv_{idx}$ for each of the transmissions in a bundle excluding the first transmission may be given based on a first determination method, a second determination method, and a third determination method. One of the first determination method, the second determination method, and the third determination method may be selected based at least on part of or all element (A) to element (I) below. A determination method for downlink (PDSCH) may be different from a determination method for uplink.

Element (A): RNTI corresponding uplink grant corresponding to the bundle, in a case of PUSCH transmission Element (B): RNTI corresponding downlink assignment corresponding to the bundle, in a case of PDSCH transmission Element (C): value of a field in uplink grant corresponding to the bundle, in a case of PUSCH transmission Element (D): value of a field in downlink assignment corresponding to the bundle, in a case of PDSCH transmission Element (E): parameter indicated by higher layer signaling (RRC message)

Element (F): whether the fourth parameter is configured

Element (G): timing at which the bundle or each of the transmissions of the bundle is transmitted Element (H): frequency, component carrier, or cell in which the bundle or each of the transmissions of the bundle is transmitted Element (I): whether transmission of the bundle is dynamically scheduled or semi-persistently scheduled For example, in a case that the RNTI corresponding to the uplink grant corresponding to the bundle is a C-RNTI and the fourth parameter is configured, the first determination method may be selected. For example, in a case that the RNTI corresponding to the uplink grant corresponding to the bundle is a SPS C-RNTI and the fourth parameter is not configured, the first determination method may be selected. For example, in a case that the RNTI corresponding to the uplink grant corresponding to the bundle is a SPS C-RNTI and the fourth parameter is configured, the second determination method may be selected.

FIG. 17 is a diagram for describing the first method for determining a redundancy version for each transmission in a bundle according to the present embodiment. In FIG. 17, the terminal apparatus 1 configured with the subframe bundling operation may perform the initial PUSCH transmission in a subframe n21. The terminal apparatus 1 configured with the subframe bundling operation may perform non-adaptive PUSCH retransmission in a subframe n22, a subframe n23, and a subframe n24. The terminal apparatus 1 performs an initial PUSCH transmission associated with redundancy version 2 in the subframe n21. Redundancy version 2 is given based on information of Modulation and coding scheme (MCS) and/or redundancy version included in the uplink grant.

The terminal apparatus 1 performs a non-adaptive PUSCH retransmission associated with redundancy version 3 in the subframe n22. The terminal apparatus 1 performs a non-adaptive PUSCH retransmission associated with redundancy version 1 in the subframe n23. The terminal apparatus 1 performs a non-adaptive PUSCH retransmission associated with redundancy version 0 in the subframe n24. In other words, the terminal apparatus 1 may perform a non-adaptive PUSCH retransmission in each of the subframe n22, the subframe n23, and the subframe n24 while incrementing the redundancy version corresponding to the immediately previous PUSCH transmission in the bundle. The redundancy version is incremented from 0 to 2, 3, and then 1 in this order. Redundancy version 0 comes after redundancy version 1.

Figure 18:
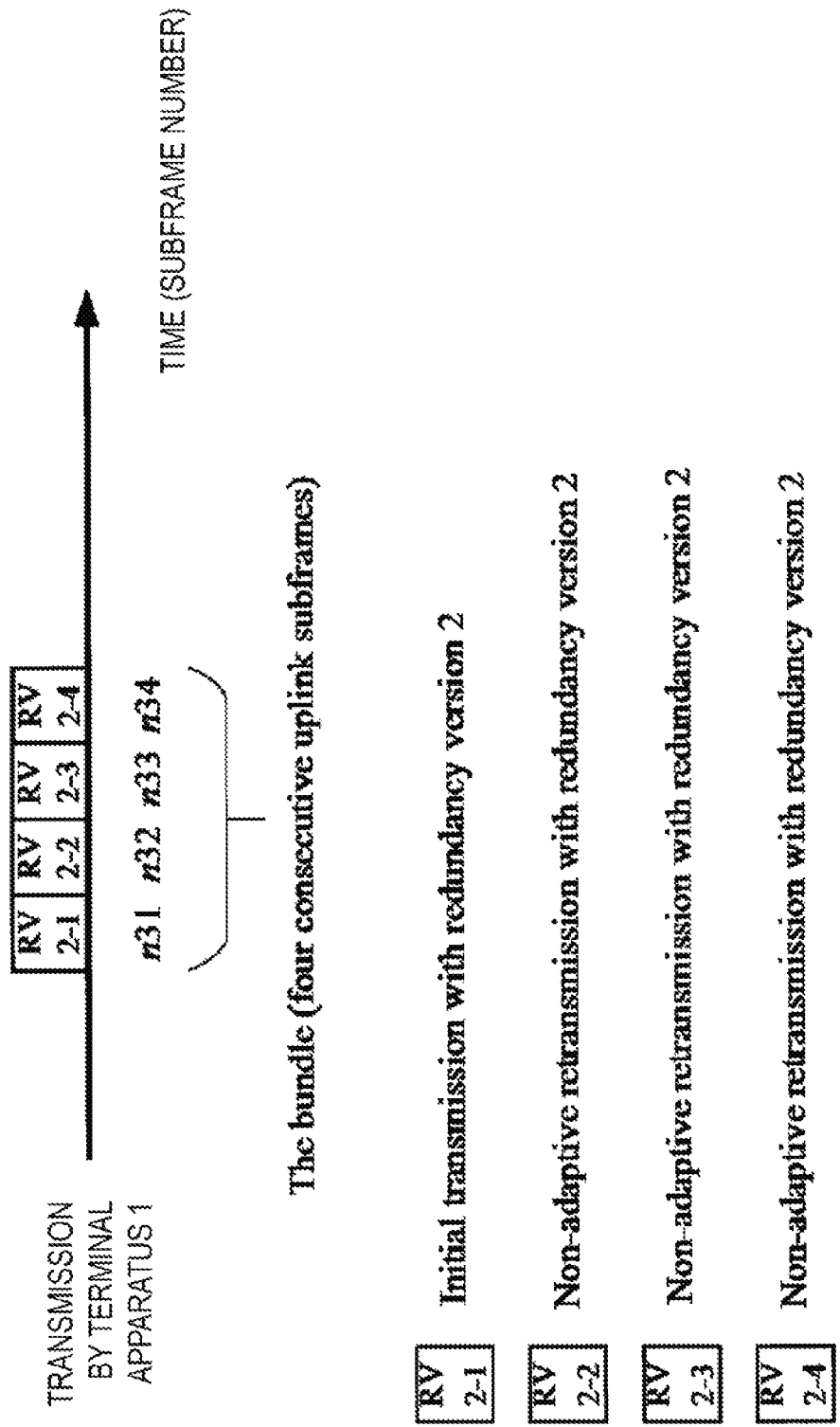
FIG. 18 is a diagram for describing a second method of determining a redundancy version for each transmission in a bundle according to the present embodiment.

FIG. 18 is a diagram for describing the second method of determining a redundancy version for each transmission in a bundle according to the present embodiment. In FIG. 18, the terminal apparatus 1 configured with the subframe bundling operation may perform the initial PUSCH transmission in a subframe n31. The terminal apparatus 1 configured with the subframe bundling operation may perform non-adaptive PUSCH retransmission in a subframe n32, a subframe n33, and a subframe n34. The terminal apparatus 1 performs the initial PUSCH transmission associated with redundancy version 2 in the subframe n31. Redundancy version 2 is given based on information of Modulation and coding scheme (MCS) and/or redundancy version included in the uplink grant.

The terminal apparatus 1 performs a non-adaptive PUSCH retransmission associated with redundancy version 2 in the subframe n32, the subframe n33, and the subframe n34. In other words, the terminal apparatus 1 may perform a non-adaptive PUSCH retransmission corresponding to the same redundancy version as the redundancy version corresponding to the first PUSCH transmission in the bundle in each of the subframe n32, the subframe n33, and the subframe n34.

Figure 19:
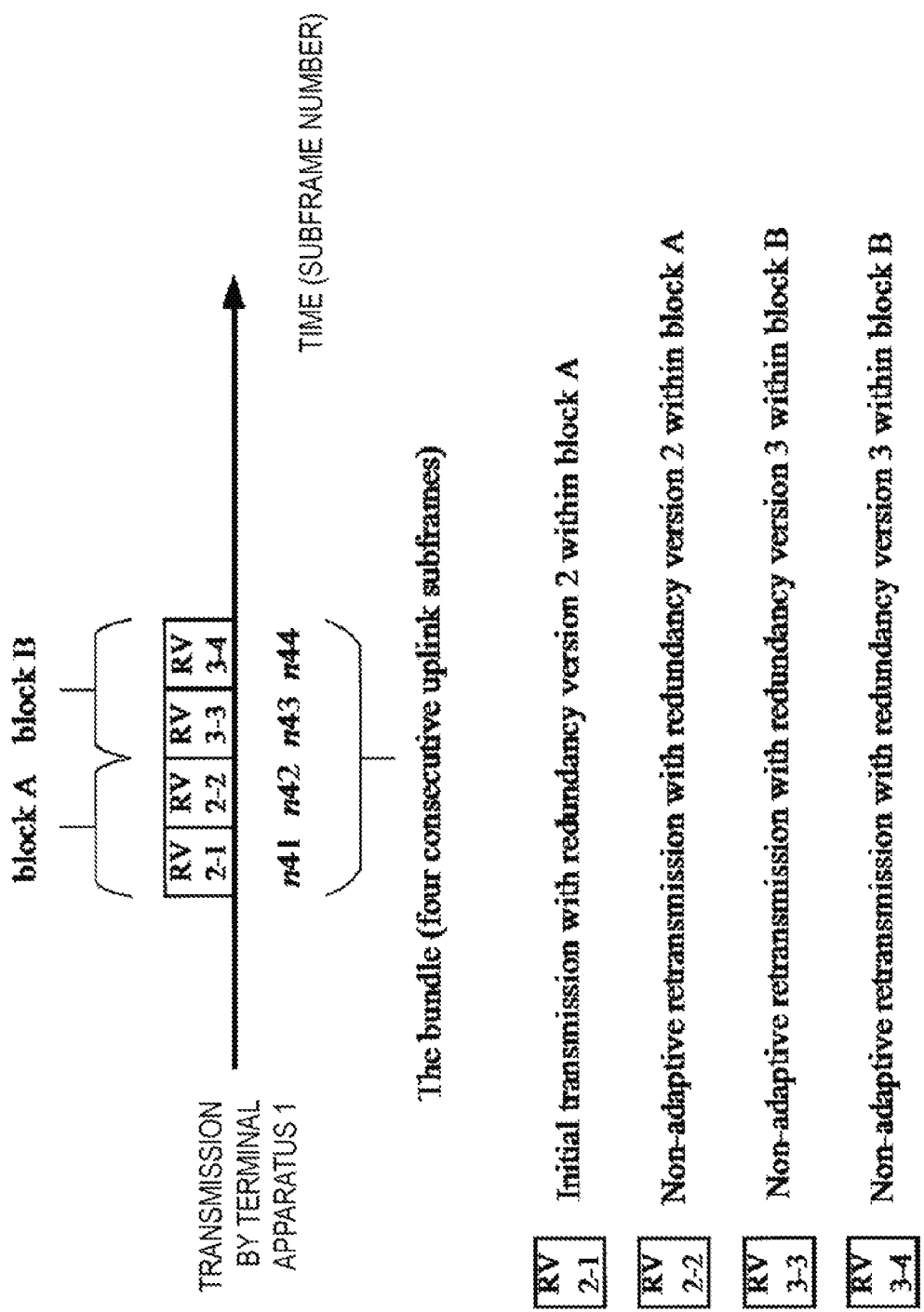
FIG. 19 is a diagram for describing a third method of determining a redundancy version for each transmission in a bundle according to the present embodiment.

FIG. 19 is a diagram for describing a third method of determining a redundancy version for each transmission in a bundle according to the present embodiment. In FIG. 19, the terminal apparatus 1 configured with the subframe bundling operation may perform the initial PUSCH transmission in a subframe n41. The terminal apparatus 1 configured with the subframe bundling operation may perform a non-adaptive PUSCH retransmission in a subframe n42, a subframe n43, and a subframe n44. The terminal apparatus 1 performs an initial PUSCH transmission associated with redundancy version 2 in the subframe n41. Redundancy version 2 is given based on information of Modulation and coding scheme (MCS) and/or redundancy version included in the uplink grant.

The terminal apparatus 1 performs a non-adaptive PUSCH transmission associated with redundancy version 2 in the subframe n42. In other words, the terminal apparatus 1 may perform a non-adaptive PUSCH retransmission corresponding to the same redundancy version as the redundancy version corresponding to the first PUSCH transmission in the bundle in the subframe n42.

The terminal apparatus 1 performs a non-adaptive PUSCH retransmission associated with redundancy version 3 in the subframe n43 and the subframe n44. In other words, the terminal apparatus 1 performs a non-adaptive PUSCH retransmission associated with redundancy version 3 in the subframe n43 and the subframe n44. In other words, the terminal apparatus 1 performs a non-adaptive PUSCH retransmission corresponding to the redundancy version given by incrementing the redundancy version given based on information of Modulation and coding scheme (MCS) and/or redundancy version included in the uplink grant, in the subframe n43 and the subframe n44.

The pair of the subframe n41 and the subframe n42 is also referred to as block A. The pair of the subframe n43 and the subframe n44 is also referred to as block B. In other words, redundancy version 3 for block B including the subframe n43 and the subframe n44 is given by incrementing redundancy version 2 for block A including the subframe n41 and the subframe n42.

As described above, the behaviors described above with reference to the drawings may be limited as behaviors performed only in one serving cell (e.g., only the primary cell). For example, only in a case that the behavior corresponding to the Semi-Persistent Scheduling and the behavior corresponding to the dynamic scheduling are performed in one serving cell, the behaviors described above may apply. In other words, for example, in a case that the behavior corresponding to the Semi-Persistent Scheduling is performed in a certain serving cell (e.g., primary cell), and the behavior corresponding to the dynamic scheduling is performed in a serving cell different from the certain serving cell (e.g., secondary cell), the behaviors described above may not apply.

The behaviors described above may be behaviors performed for multiple serving cells (e.g., the primary cell and the secondary cell). For example, even in the case that the behavior corresponding to the Semi-Persistent Scheduling is performed in a certain serving cell (e.g., primary cell), and the behavior corresponding to the dynamic scheduling is performed in a serving cell (e.g., secondary cell) different from the certain serving cell, the behaviors described above may apply.

Hereinafter, various aspects of the terminal apparatus 1 and the base station apparatus 3 according to the present embodiment will be described.

(1) A first aspect of the present embodiment is the terminal apparatus 1 including at least one processor and a memory. The at least one processor is configured to and/or programmed to (a) perform processing of receiving a first uplink grant corresponding to a Hybrid Automatic Repeat Request (HARQ) process and (b) perform processing of a Medium Access Control (MAC) entity. The MAC entity (a) includes an HARQ entity configured to manage the HARQ process and (b) is configured to deliver the first uplink grant to the HARQ entity. The HARQ entity is configured to (a) deliver the first uplink grant to the HARQ process and instruct the HARQ process to trigger an initial transmission, in a case that the first uplink grant is addressed to a Cell Radio Network Temporary Identifier (C-RNTI) and a first NDI associated with the first uplink grant is toggled compared to a second NDI in an immediately previous transmission of the HARQ process, and (b) deliver the first uplink grant to the HARQ process and instruct the HARQ process to trigger an initial transmission, in a case that a fourth parameter is configured, the first uplink grant is addressed to a Semi Persistent Scheduling Cell Radio Network Temporary Identifier (SPS C-RNTI), and a state is not that only a padding Buffer Status Report (BSR) can be transmitted, and is configured (c) not to deliver the first uplink grant to the HARQ process and not to instruct the HARQ process to trigger an initial transmission, in a case that the fourth parameter is configured, the first uplink grant is addressed to the SPS C-RNTI, and a state is that only the padding Buffer Status Report (BSR) can be transmitted, and consider that the first NDI for the HARQ process is toggled regardless of a value of the first NDI in a case that the first uplink grant corresponds to the C-RNTI, and the second uplink grant delivered to the HARQ process previously is an uplink grant received for the SPS C-RNTI or a configured uplink grant.

(2) In the first aspect of the present embodiment, the HARQ entity is configured to (a) deliver the first uplink grant to the HARQ process and instruct the HARQ process to generate an adaptive retransmission, in a case that the first uplink grant is addressed to the C-RNTI and the first NDI associated with the first uplink grant is not toggled compared to the second NDI in an immediately previous transmission of the HARQ process and (b) deliver the first uplink grant to the HARQ process and instruct the HARQ process to trigger an initial transmission, regardless of whether a state is that in which only the padding BSR can be transmitted, in a case that the fourth parameter is not configured and the first uplink grant is addressed to the SPS C-RNTI.

(3) In the first aspect of the present embodiment, the MAC entity is configured to store, in a case that a third uplink grant received for the SPS C-RNTI indicates semi-persistent activation, the third uplink grant as the configured uplink grant in the memory.

(4) A second aspect of the present embodiment is the terminal apparatus 1 including: the receiver 105 configured to receive a Physical Downlink Control Channel (PDCCH) including downlink control information; and the transmitter 107 configured to transmit a single bundle, based on the downlink control information. The bundle includes multiple consecutive transmissions in the time domain. A redundancy version for the first transmission in the bundle is indicated by a field included in the downlink control information. A redundancy version for each of the multiple consecutive transmissions excluding the first transmission is given based at least on a parameter indicated by higher layer signaling and the redundancy version for the first transmission.

(5) A third aspect of the present embodiment is the terminal apparatus 1 including: the receiver 105 configured to receive a Physical Downlink Control Channel (PDCCH) including downlink control information; and the decoding unit 1071 configured to decode a single bundle, based on the downlink control information. The bundle includes multiple consecutive transmissions in the time domain. A redundancy version for the first transmission in the bundle is indicated by a field included in the downlink control information. A redundancy version for each of the multiple consecutive transmissions excluding the first transmission is given based at least on a parameter indicated by higher layer signaling and the redundancy version for the first transmission.

(6) A fourth aspect of the present embodiment is the base station apparatus 3 including: the transmitter 305 configured to transmit a Physical Downlink Control Channel (PDCCH) including downlink control information; and the receiver 307 configured to receive a transmission of a single bundle, based on the downlink control information. The bundle includes multiple consecutive transmissions in the time domain. A redundancy version for the first transmission in the bundle is indicated by a field included in the downlink control information. A redundancy version for each of the multiple consecutive transmissions excluding the first transmission is given based at least on a parameter indicated by higher layer signaling and the redundancy version for the first transmission.

(7) A fifth aspect of the present embodiment is the base station apparatus 3 including the transmitter 305 configured to transmit a Physical Downlink Control Channel (PDCCH) including downlink control information and transmit a single bundle, based on the downlink control information. The bundle includes multiple consecutive transmissions in the time domain. A redundancy version for the first transmission in the bundle is indicated by a field included in the downlink control information. A redundancy version for each of the multiple consecutive transmissions excluding the first transmission is given based at least on a parameter indicated by higher layer signaling and the redundancy version for the first transmission.

(8) In the second and fourth aspects of the present embodiment, the multiple consecutive transmissions in the time domain are transmissions of the Physical Uplink Shared Channel (PUSCH).

(9) In the third and fifth aspects of the present embodiment, the multiple consecutive transmissions in the time domain are transmissions of the Physical Downlink Shared Channel (PDSCH).

This allows the uplink data to be efficiently transmitted.

Each program running on the base station apparatus 3 and the terminal apparatus 1 of the above-described embodiment according to one aspect of the present invention may be a program that controls a Central Processing Unit (CPU) and the like, such that the program causes a computer to operate in such a manner as to realize the functions of the above-described embodiment according to the one aspect of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal apparatus 1 and the base station apparatus 3 according to the above-described embodiment may be partially achieved by a computer. In that case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal apparatus 1 or the base station apparatus 3, and the computer system includes an OS and hardware components such as a peripheral apparatus. Furthermore, the "computer-readable recording medium" refers to a portable medium such as a flexible disk, a magneto-optical disk, a ROM, a CD-ROM, and the like, and a storage apparatus such as a hard disk built into the computer system.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station apparatus 3 according to the above-described embodiment may be achieved as an aggregation (an apparatus group) constituted of multiple apparatuses. Each of the apparatuses configuring such an apparatus group may include some or all portions of each function or each functional block of the base station apparatus 3 according to the above-described embodiment. The apparatus group may include each general function or each functional block of the base station apparatus 3. Furthermore, the terminal apparatus 1 according to the above-described embodiment can also communicate with the base station apparatus as the aggregation.

Furthermore, the base station apparatus 3 according to the above-described embodiment may serve as an Evolved Universal Terrestrial Radio Access Network (EUTRAN). Furthermore, the base station apparatus 3 according to the above-described embodiment may have some of or all the functions of a node higher than an eNodeB.

Furthermore, some or all portions of each of the terminal apparatus 1 and the base station apparatus 3 according to the above-described embodiment may be typically achieved as an LSI which is an integrated circuit or may be achieved as a chip set. The functional blocks of each of the terminal apparatus 1 and the base station apparatus 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiment, the terminal apparatus has been described as an example of a communication apparatus, but the present invention is not limited to such a terminal apparatus, and is applicable to a terminal apparatus or a communication apparatus of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to an aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be used, for example, in a communication system, a communication device (e.g., a portable telephone apparatus, a base station apparatus, a wireless LAN apparatus, or a sensor device), an integrated circuit (e.g., a communication chip), a program, or the like.

REFERENCE SIGNS LIST 1 (1A, 1B, 1C) Terminal apparatus
3 Base station apparatus
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 SPS control unit
3011 Radio resource control unit
3013 Scheduling unit
3015 SPS control unit

The invention claimed is:

1. A terminal apparatus comprising at least one processor and a memory, wherein
the processor is configured to and/or programmed to:
receive a first uplink grant with Cyclic Redundancy Check (CRC) parity bits scrambled by a Cell-Radio Network Temporary Identifier (C-RNTI) for dynamically scheduled transmission on a Physical Downlink Control Channel (PDCCH);
store a second uplink grant in the memory;
consider that the second uplink grant occurs in a subframe which is given by a subframe offset and an interval;
perform a plurality of transmissions based on the first uplink grant or the second uplink grant, the plurality of transmissions corresponding to a bundle, in which a non-adaptive retransmission is triggered without waiting for a feedback of a previous transmission; and
determine a redundancy version corresponding to each of the plurality of transmissions except for an initial transmission of the plurality of transmissions, based on whether each of the plurality of transmissions is related to the second uplink grant or not.

2. A base station apparatus comprising at least one processor and a memory, wherein
the processor is configured to and/or programmed to:
send a first uplink grant with Cyclic Redundancy Check (CRC) parity bits scrambled by a Cell-Radio Network Temporary Identifier (C-RNTI) for dynamically scheduled transmission on a Physical Downlink Control Channel (PDCCH);
determine that a second uplink grant occurs in a subframe which is given by a subframe offset and an interval;
receive a plurality of transmissions from a terminal apparatus based on the first uplink grant or the second uplink grant, the plurality of transmissions corresponding to a bundle, in which a non-adaptive retransmission is triggered without waiting for a feedback of a previous transmission; and consider a redundancy version corresponding to each of the plurality of transmissions except for an initial transmission of the plurality of transmissions, based on whether each of the plurality of transmissions is related to the second uplink grant or not.

3. A communication method of a terminal apparatus, the communication method comprising:

receiving a first uplink grant with Cyclic Redundancy Check (CRC) parity bits scrambled by a Cell-Radio Network Temporary Identifier (C-RNTI) for dynamically scheduled transmission on a Physical Downlink Control Channel (PDCCH);

storing a second uplink grant in a memory;

considering that the second uplink grant occurs in a subframe which is given by a subframe offset and an interval;

performing a plurality of transmissions based on the first uplink grant or the second uplink grant, the plurality of transmissions corresponding to a bundle, in which a non-adaptive retransmission is triggered without waiting for a feedback of a previous transmission; and determining a redundancy version corresponding to each of the plurality of transmissions except for an initial transmission of the plurality of transmissions, based on whether each of the plurality of transmissions is related to the second uplink grant or not.

4. A communication method of a base station apparatus, the communication method comprising:

sending a first uplink grant with Cyclic Redundancy Check (CRC) parity bits scrambled by a Cell-Radio Network Temporary Identifier (C-RNTI) for dynamically scheduled transmission on a Physical Downlink Control Channel (PDCCH);

determining that a second uplink grant occurs in a subframe which is given by a subframe offset and an interval;

receiving a plurality of transmissions from a terminal apparatus based on the first uplink grant or the second uplink grant, the plurality of transmissions corresponding to a bundle, in which a non-adaptive retransmission is triggered without waiting for a feedback of a previous transmission; and considering a redundancy version corresponding to each of the plurality of transmissions except for an initial transmission of the plurality of transmissions, based on whether each of the plurality of transmissions is related to the second uplink grant or not.

* * * * *